United States Patent [19]
Tagami et al.

[11] Patent Number: 5,342,895
[45] Date of Patent: Aug. 30, 1994

[54] BLOCK COPOLYMER AND METHOD OF PRODUCING THE SAME

[75] Inventors: Toshio Tagami, Shizuoka; Yoshio Imai, Tokyo; Masaaki Kakimoto, Yokohama; Osamu Kiyohara; Hitoshi Narushima, both of Shizuoka, all of Japan

[73] Assignee: Tomoegawa Paper Co., Ltd., Tokyo, Japan

[21] Appl. No.: 11,845

[22] Filed: Jan. 28, 1993

Related U.S. Application Data

[63] Continuation of Ser. No. 495,140, Mar. 19, 1990, abandoned.

[30] Foreign Application Priority Data

Mar. 17, 1989 [JP] Japan .................................. 1-63493
Apr. 24, 1989 [JP] Japan .................................. 1-101774
Feb. 9, 1990 [JP] Japan .................................. 2-28309

[51] Int. Cl.$^5$ .......................................... C08L 77/00
[52] U.S. Cl. ..................................... 525/183; 525/92; 525/184
[58] Field of Search .......................... 525/183, 184, 92

[56] References Cited

U.S. PATENT DOCUMENTS

| | | | |
|---|---|---|---|
| 3,853,796 | 12/1974 | Oldack et al. | 525/92 |
| 4,417,031 | 11/1983 | Aharoni et al. | 525/425 |
| 4,567,226 | 1/1986 | Grigo et al. | 524/538 |
| 4,810,753 | 3/1989 | Koga et al. | 525/183 |
| 4,843,127 | 6/1989 | Akkapeddi et al. | 525/183 |
| 4,996,263 | 2/1991 | Pyke et al. | 525/178 |
| 5,073,601 | 12/1991 | Mülhaupt et al. | 525/109 |

OTHER PUBLICATIONS

S. Ogata et al., Macromolecules, 18, pp. 851–855 (1985).
S. Ogata et al., Polymer Journal, vol. 17, No. 8, pp. 935–941.
Patent Abstracts of Japan vol. 9, No. 180 (C-293) (1903), Jul. 25, 1985; & J P-A-6 049 026 (Toukiyou Kogyo Daigaku) Mar. 18, 1985.
Patent Abstracts of Japan vol. 6, No. 131 (C-114) (1009), Jul. 17, 1982; & J P-A-5 757 720 (DAICEL) Apr. 7, 1982.

Primary Examiner—Ana L. Carrillo
Attorney, Agent, or Firm—Oblon, Spivak, McClelland, Maier & Neustadt

[57] ABSTRACT

Disclosed is a polyamide/polybutadiene/acrylonitrile block copolymer useful in a wide variety of applications, such as an adhesive film, which comprises a polycondensate comprising a polybutadiene/acrylonitrile copolymer having a carboxyl group at each terminal thereof and a polyamide having an aminoaryl group at each terminal, and which is represented by general formula (I)

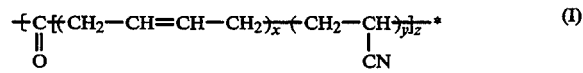

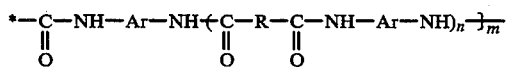

wherein R is a divalent organic group, Ar is a divalent aromatic group, x, y, z, m and n each: represent mean degree of polymerization and are integers in the ranges of x=3 to 7, y=1 to 4, z=5 to 15, n=1 to 30, and nm=2 to 20, respectively. Also, disclosed is a method of producing the polyamide/polybutadiene based block copolymer by polycondensing an aromatic diamine with an aromatic dicarboxylic acid to form a polyamide having an aminoaryl group at each terminal thereof, and then polycondensing it with a poiybutadiene/acrylonitrile copolymer having a carboxyl group at each terminal thereof, preferably in the presence of an aromatic phosphite and a pyridine derivative.

6 Claims, 13 Drawing Sheets

BLOCK COPOLYMER AND METHOD OF PRODUCING THE SAME

This application is a continuation of application Ser. No. 07/495,140, filed on Mar. 19, 1990, now abandoned.

BACKGROUND OF THE INVENTION

1. Field of the Invention

The present invention relates to a novel block copolymer and a method of producing the same. More particularly, it relates to a polyamide/polybutadiene/acrylonitrile block copolymer which can be crosslinked and to a method of producing the same.

2. Description of Related Arts

It has been known that polybutadienes have flexible molecular structures and polybutadiene based block copolymers whose representative example is styrene/butadiene block copolymer are excellent thermoplastic elastic material. However, there is a problem that polystyrene chain in the block copolymer has a low softening point and in the case where the block copolymer is used at relatively high temperatures and in some other cases, it does not show satisfactory performance. In order to solve the problem there has been proposed a polyamide/polybutadiene based block copolymer (cf. Japanese Patent Publication (Kokai) No. 60-4 9026 and Japanese Patent Publication (Kokoku) No. 62-3171).

However, the polyamide/polybutadiene based block copolymers proposed heretofore have poor solubility in solvents and poor compatibility with other polymers although they are thermoplastic elastic materials having high heat resistance.

SUMMARY OF THE INVENTION

The present invention has been made in view of the above-described problems involved in the prior art.

Accordingly, an object of the present invent ion is provide a novel block copolymer having good heat resistance, and excellent solubility in solvents and also excellent compatibility with other polymers as well as a method of producing the same.

As the result of investigation with view to solving the above-described problems involved in the prior art, the present inventors have found that the above-described problems can be solved by using an polybutadiene/acrylonitrile copolymer additionally when producing a polyamide/polybutadiene based block copolymer, thus completing the present invention.

That is, according to a first aspect of the present invention, there is provided a polyamide/polybutadiene based block copolymer which comprises a polycondensate comprising an polybutadiene/acrylonitrile copolymer having a carboxyl group at each terminal thereof and a polyamide having an aminoaryl group at each terminal, and which represented by general formula (I)

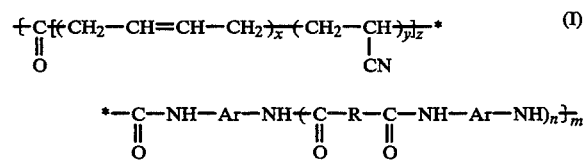

wherein R is a divalent organic group, Ar is a divalent aromatic group, x, y, z, m and n each represent mean degree of polymerization and are integers in the ranges of x=3 to 7, y=1 to 4, z=5 to 15, n=1 to 30, and m=2 to 20, respectively.

According to a second aspect of the present invention, there is provided a method of producing a polyamide/polybutadiene based block copolymer represented by general formula (I) above, which comprises polycondensing an polybutadiene/acrylonitrile copolymer having a carboxyl group at each terminal thereof and represented by general formula (II) below:

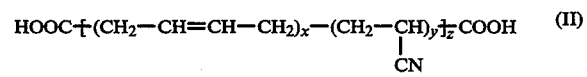

ps wherein x, y and z each are mean degree of polymerization and are in the ranges of x=3 to 7, y=1 to 4, and z=5 to 15, with a polyamide having an aminoaryl group at each terminal thereof and represented by general formula (III) below:

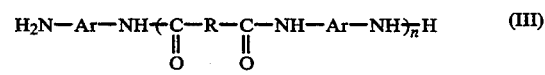

wherein R is a divalent organic group, Ar is a divalent aromatic group, n is mean degree of polymerization and is an integer in the range of n=1 to 30, in the presence of an aromatic phosphite ester and a pyridine derivative.

The polyamide/polybutadiene/acrylonitrile block copolymer of the present invention carl give rise to a thermoplastic elastic material which has remarkably improved solubility in solvents and compatibility with other resins, which is easy to handle without causing drastic change in physical properties, and therefore it is useful as a basic material of wide applicability.

DETAILED DESCRIPTION OF THE INVENTION

Figure 1:
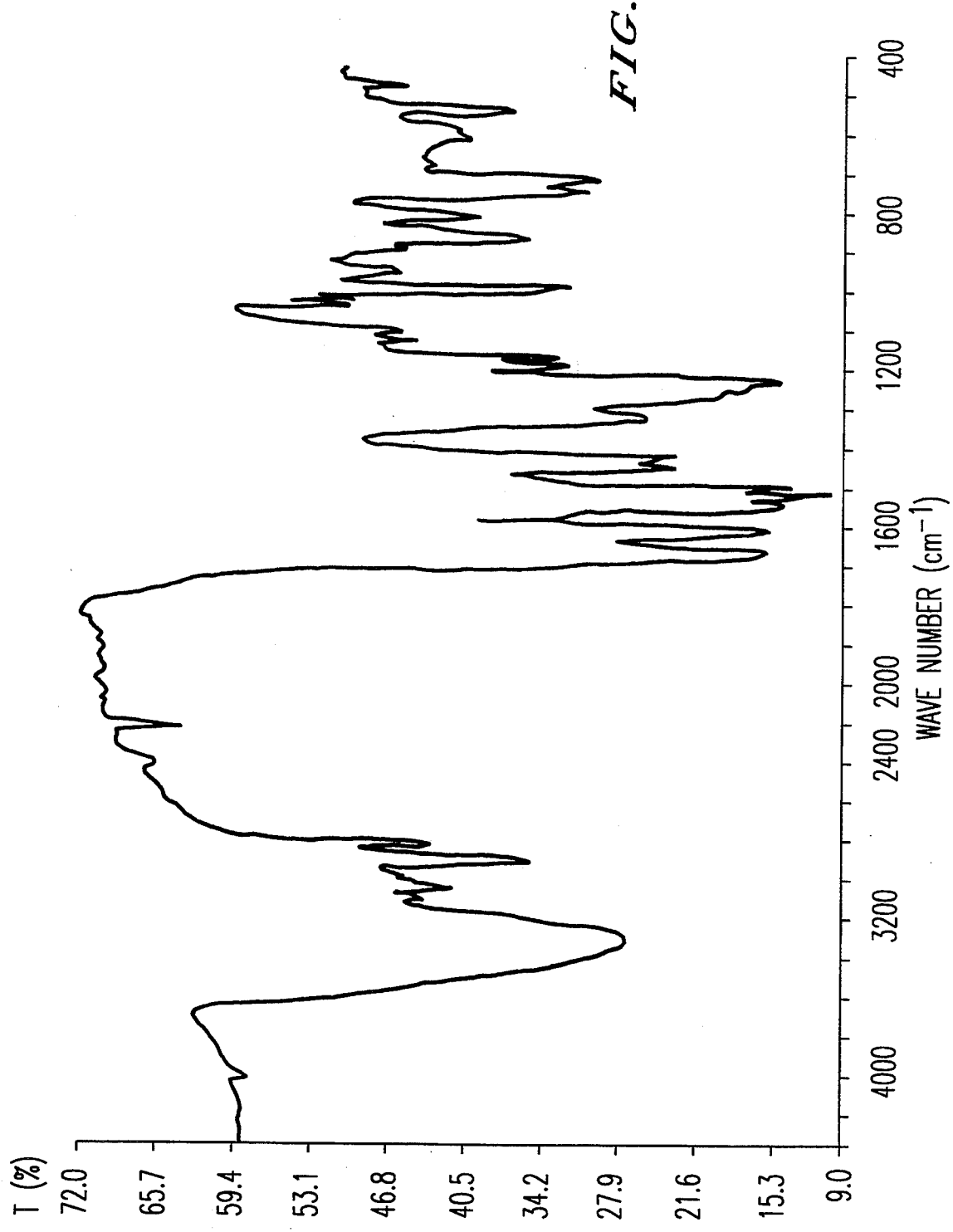
FIGS. 1 to 7 are graphs showing infrared absorption spectra of polyamide/polybutadiene/acrylonitrile block copolymers according to Examples 1 to 7 of the present invention, respectively.

The polyamide/polybutadiene/acrylonitrile block copolymer of the present invention has a structure represented by general formula (I) above and san be produced by polycondensation reaction between an polybutadiene/acrylonitrile copolymer having a carboxyl group at each terminal thereof and represented by general formula (II) above and a polyamide having an aminoaryl group at each terminal thereof and represented by general formula (III) above.

Polycondensation reaction is performed preferably in the presence of an aromatic phosphite and a pyridine derivative. The polycondensation reaction can also be performed by simply mixing the polybutadiene/acrylonitrile copolymer having a carboxyl group at each terminal thereof with the polyamide having an aminoaryl group at each terminal thereof and heating the resulting mixture. In this case, it is necessary to carry out the polycondensation reaction at high temperatures with the result that there occur inevitably side reactions such as amide exchange reaction and decomposition reaction of polybutadiene/acrylonitrile copolymer chain. On the contrary, when the reaction is performed in the presence of an aromatic phosphite and a pyridine derivative, high temperature is unnecessary upon the polycondensation reaction and side reactions such as decomposition reaction of polybutadiene/acrylonitrile copolymer chain and amide exchange reaction can be avoided, which makes it possible to readily produce block copolymers having a controlled structure. This is a great advantage.

In the polybutadiene/acrylonitrile copolymer having a carboxyl group at each terminal thereof and represented by general formula (II) which can be used in the method of the present invention, the stereochemical structure of double bond may be a cis structure or a trans structure. The polybutadiene/acrylonitrile copolymer having a carboxyl group at each terminal thereof and represented by general formula (II) may be produced by any method that enables introduction of a carboxyl ground at each terminal of a polymer. Usually, it can be produced by anion polymerization or radical polymerization. Mean degree of polymerization z is preferably in the range of from 5 to 15 in view of the physical properties such as tensile strength and elastic modulus in tension of normally produced block copolymer.

The divalent organic group represented by R in general formula (I) may be any divalent substituents, for example, divalent aliphatic, alicyclic and aromatic groups.

The polyamide having an aminoaryl group at each terminal thereof and represented by general formula (III) can be produced by reacting an excessive amount of an aromatic diamine represented by general formula (IV) and a dicarboxylic acid represented by general formula (V) or its derivative according to the following reaction scheme:

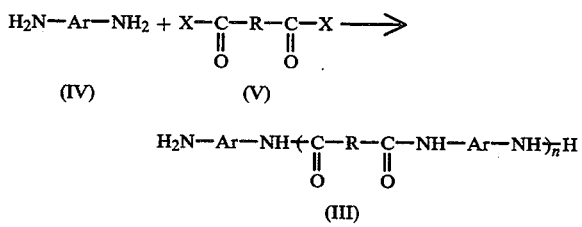

wherein X represents a hydroxyl group, an alkoxy group such as a methoxy group, an aryloxy group such as a phenoxy group, an alkylthio group such as an ethylthio group, an arylthio group such as a phenythio group, Ar, R and n have the same meanings as defined above.

As for the aromatic diamine represented by general formula (IV) above, there can be cited, for example, m-phenylenediamine, p-phenylenediamine, 4,4'-diaminobiphenyl, 3,3'-methylenedianiline, 4,4'-methylenedianiline, 4,4'-ethylenedianiline, 4,4'-isopropylidenedianiline, 3,4'-oxydianiline, 4,4'-oxydianiline, 4,4'-thiodianiline, 4,4'-isopropylidenedianiline, 3,3'-carbonyldianiline, 4,4'-carbonyldianiline, 3,3'-sulfonyldianiline, 4,4'-sulfonyldianiline, 1,4-naphthalenediamine, 1,5-naphthalenediamine, 2,6-naphthalenediamine, 1,3-bis(m-aminophenyl)-1,1,3,3-tetramethyldisiloxane, and the like. However, it is not limited thereto.

The dicarboxylic acid represented by general formula (V) above may be any dicarboxylic acids such as aliphatic, alicyclic and aromatic ones, and there can be cited various carboxylic acids, for example, succinic acid, glutaric acid, adipic acid, pimelic acid, suberic acid, acid, sebacic acid, undecanedioic acid, dodecanedioic acid, 1,3-cyclohexanedicarboxylic acid, 1,4-cyclohexanedicarboxylic acid, isophthalic acid, terephthalic acid, 4,4'-biphenyldicarboxylic acid, 3,3'-methylenedibenzoic acid, 4,4'-methylenedibenzoic acid, 4,4'-oxydibenzoic acid, 4,4'-thiodibenzoic acid, 3,3'-carbonyldibenzoic acid, 4,4'-carbonyldibenzoic acid, 4,4'-sulfonyldibenzoic acid, 1,4-naphthalenedicarboxylic acid, 1,5-naphthalenedicarboxylic acid, 2,6-naphthalenedicarboxylic acid, and the like, and their derivatives. However, it is not limited thereto.

The reaction between the excessive amount of aromatic diamine represented by general formula (IV) and the dicarboxylic acid represented by general formula (V) or its derivative may be carried out by any method. It is preferred that the mean degree of polymerization, n, of the resulting polyamide represented by general formula (III) is usually in the range of from 1 to 30.

In the present invention, the polycondensation of the reactants, i.e., the polybutadiene/acrylonitrile copolymer having a carboxyl group an each terminal thereof and represented by general formula (II) and the polyamide having an aminoaryl group at each terminal thereof and represented by general formula (III) is carried out in the presence of an aromatic phosphorous ester and a pyridine derivative.

As for the aromatic phosphorous ester which is used, there can be cited, for example, triphenyl phosphite, diphenyl phosphite, tri-o-tollyl phosphite, di-o-tollyl phosphite, tri-m-tollyl phosphite, di-m-tollyl phosphite, tri-p-tollyl phosphite, di-p-tollyl phosphite, di-o-chlorophenyl phosphite, tri-p-chlorophenyl phosphite, di-p-chlorophenyl phosphite, and the like.

As for the pyridine derivative, there can be cited, for example, pyridine, 2-picoline, 3-picoline, 4-picoline, 2,4-lutidine, 2,6-lutidine, 3,5-lutidine, and the like.

Upon the reaction, solution polymerization method in which a mixed solvent containing a pyridine derivative is usually used. The organic solvent used as mixed solvent is limited to those solvents that do not react substantially with the reactants and the aromatic phosphine. In addition, it is preferably a good solvent for the both reactants and also a good solvent for the block copolymer as the product. Typical examples cf such organic solvent include amide solvents such as N-methyl-2-pyrrolidone and N,N-dimethylacetamide.

In the present invention, inorganic salts represented by lithium chloride, calcium chloride, etc. can be added to the reaction system in order to obtain a block copolymer having a high degree of polymerization.

More particularly, the polycondensation reaction can be carried out by agitating with heating desired amounts of the polybutadiene/acrylonitrile copolymer having a carboxyl group at each terminal thereof and represented by general formula (II) and of the polyamide having an aminoaryl group at each terminal thereof and represented by general formula (III) in an organic solvent, typically N-methyl-2-pyrrolidone, in the presence of an aromatic phosphite and a pyridine derivative under an inert atmosphere such as nitrogen gas.

The amount of the aromatic phosphorous ester used is usually no less than equimolar amount with respect to the carboxyl group in the polybutadiene/acrylonitrile copolymer represented by general formula (II). But use of 30 mole equivalents or more of it is disadvantageous from economical viewpoint. On the other hand, the amount of the pyridine derivative must be at least equimolar with respect to the carboxyl group in the polybutadiene/acrylonitrile copolymer represented by general formula (II). Practically, it is preferred to use it in a large excess amount so that it can serve as a reaction solvent. When mixed solvent is used, its amount is usually such that contains reactants in an amount of from 5 to 30% by weight.

In the present invention, reaction temperature is usually in the range of from 60° C. to 140° C. Reaction time is greatly influenced by the reaction temperature and in many cases is between several minutes to 20 hours. In any case, it is desirable to agitate the reaction system until maximum viscosity which means maximum degree of polymerization can be obtained.

After completion of the reaction, the reaction mixture is poured into a bad solvent such as methanol or hexane to separate the resulting block copolymer, followed by purification by a reprecipitation method to remove no reacted starting materials, low degree polymerized components and in organic salts, thus obtaining purified block copolymer.

It is necessary that the resulting block copolymer has mean degree of polymerization m of from 2 to 20. When exceeds 20, it is undesirable in view of processability. It is possible to decrease mean degree of the resulting polymer when performing polycondensation using an excessive amount of either one of the reactants.

According to a preferred embodiment of the present invention, there is provided a polyamide/-polybutadiene/acrylonitrile block copolymer which comprises a polycondensate comprising a polyamide having an aminoaryl group at each terminal thereof and prepared by polycondensation of an aromatic dicarboxylic acid with an aromatic diamine, and a polybutadiene/acrylonitrile copolymer having a carboxyl group at each terminal thereof, and which is represented by general formula (Ia)

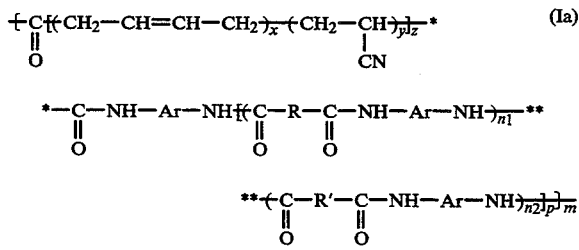

wherein R is a divalent organic group, R' is a divalent aromatic group having a phenolic hydroxyl group, Ar is a divalent aromatic group, x, y, z, m, $n_1$, $n_2$ and p each represent mean degree of polymerization and are integers in the ranges of x=3 to 7, y=1 to 4, z=5 to 15, $n_1$=0 to 29, $n_2$=1 to 30, m=2 to 20, and p=1 to 30, respectively, provided that $n_2/(n_1+n_2) \geq 0.04$.

The block copolymer according to this embodiment corresponds to the block copolymer represented by general formula (I) in which the polyamide component of formula

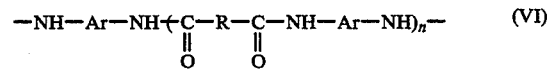

is replaced by the following partial structure:

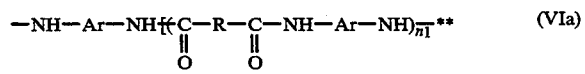

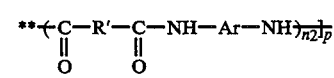

wherein $n_1$ and $n_2$ each are mean degree of polymerization and integers in the range of $n_1$ m 1 to 30, $n_2$=1 to 30, provided that $n_2/(n_1+n_2) \geq 0.04$.

The polyamide/butadiene/acrylonitrile based block copolymer having a chemical structure represented by general formula (Ia) above can be produced by polycondensing an aromatic dicarboxylic acid having at least 4% by mole of a phenolic hydroxyl group with an aromatic diamine to synthesize a polyamide having an aminoaryl group at each terminal thereof and represented by general formula (III)a below:

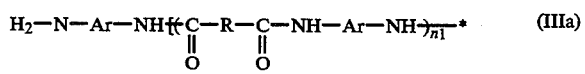

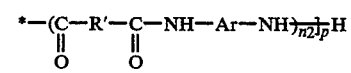

wherein R is a divalent organic group, R' is a divalent aromatic group having a phenolic hydroxyl group, Ar is a divalent aromatic group, $n_1$, $n_2$ and p each are mean degree of polymerization and are an integers in the range of $n_1$=1 to 30, $n_2$=0 to 29 and p=1 to 30, respectively, provided that $n_2/(n_1+n_2) \geq 0.04$, and further polycondensing tile polyamide thus obtained with a polybutadiene/acrylonitrile copolymer having a carboxyl group at each terminal thereof and represented by general formula (IIa) below:

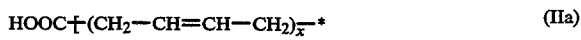

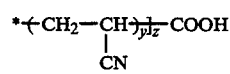

wherein x, y and z each are mean degree of polymerization and are integers in the ranges of x=3 to 7, y=1 to 4, and z=5 to 15.

In the present invention, the aromatic dicarboxylic acid having a phenolic hydroxyl group which can be used for the synthesis of the polyamide represented by general formula (IIIa) above is not limited particularly and any aromatic compound can be used that has two carboxyl groups and a hydroxyl group attached to its aromatic ring. Preferred examples thereof include 4-hydroxyisophthalic acid, 5-hydroxyisophthalic acid, and their derivatives. In addition, there can be cited, for example, 2-hydroxyisophthalic acid, 3-hydroxyphthalic acid, 2-hydroxyphthalic acid, 2-hydroxyterephthalic acid, 4,4'-methylenebis(3-hydroxy-2-naphthalenecarboxylic acid), and the like.

In the present invention, the aromatic dicarboxylic acids having a phenolic hydroxyl group may be used singly or in combination with other aromatic dicarboxylic acids. When used in combination with other dicarboxylic acids, the amount of the aromatic dicarboxylic acid having a phenolic hydroxyl group must be present in an amount of at least 4% by mole based on the amount of total aromatic dicarboxylic acids.

As for the aromatic dicarboxylic acid which can be used in the present invention in combination with the dicarboxylic acid having a phenolic hydroxyl group, there can be cited those described above with respect to the compound of general formula (V). Preferred examples thereof include dicarboxylic acids such as isophthalic acid, terephthalic acid, 4,4'-biphenyldicarboxylic acid, 3,3'-methylenedibenzoic acid, 4,4'-methylenedibenzoic acid, 4,4'-oxydibenzoic acid, 4,4'-thiodibenzoic acid, 3,3'-carbonyldibenzoic acid, 4,4'-carbonyldibenzoic acid, 4,4'-sulfonyldibenzoic acid, 1,4-naphthalenedicarboxylic acid, 1,5-naphthalenedicarboxylic acid, and 2,6-naphthalenedicarboxylic acid, and their derivatives although it is not limited to these compounds.

As for the aromatic diamine which can be used in the present invent ion, there can be cited those described with respect to the aromatic diamine of general formula (IV) above. However, it is not limited thereto. These aromatic diamines may be used singly or a plurality of them may be used in combination.

Polycondensation between the above-described aromatic dicarboxylic acid add the above-described aromatic diamine can be carried out using an excessive amount of the aromatic diamine of general formula (IV) and in the presence of an aromatic phosphite and a pyridine derivative.

The same aromatic phosphite as described above can be used. Also, the same pyridine derivatives as described above can be used.

Then the polyamide represented by general formula (IIIa) synthesized by the above-described polycondensation reaction is polycondensed with the polybutadiene/acrylonitrile copolymer having a carboxyl group at each terminal thereof represented by general formula (IIa) above by block copolymerization. The block copolymerization can be performed essentially in the same manner as the reaction between the aromatic diamine of general formula (IV) and the dicarboxylic acid of general formula (V).

Also in the polybutadiene/acrylonitrile copolymer having a carboxyl group at each terminal thereof represented by general formula (IIa), the stereochemical structure of double bond may be a cis structure or a trans structure. The polybutadiene/acrylonitrile copolymer having a carboxyl group at each terminal thereof and represented by general formula (IIa) may be produced by any method that enables introduction of a carboxyl group at each terminal of a polymer. The same method as described above can be used under essentially the same conditions as described above and specific explanation is omitted here.

In the above-described embodiment, the polycondensation reaction and block copolymerization reaction described above must be performed in the presence of an aromatic phosphite and a pyridine derivative. When the polycondensation reaction is carried out in the presence of the aromatic phosphite and pyridine derivative, there is no need to protect phenolic hydroxyl groups which are functional groups and the polycondensation reaction proceeds without causing reactions between The phenolic hydroxyl groups and carboxyl groups or amino groups.

The above-described block copolymer of the present invention can be obtained by adding the polyamide and polybutadiene/acrylonitrile copolymer having a carboxyl group at each terminal thereof to the polyamide solution thus obtained, and heating it to cause polycondensation by block copolymerization.

In the above-described embodiment, the polycondensation reaction can also be performed by simply reacting the above-described aromatic dicarboxylic acid, aromatic diamine and polybutadiene, acrylonitrile copolymer in a state where they are copresent in a solvent such as N-methyl-2-pyrrolidone and the like.

The compositional proportion of the polybutadiene/acrylonitrile copolymer to the polyamide polycondensate in the polyamide/polybutadiene/acrylonitrile block copolymer having a phenolic hydroxyl group synthesized as described above is determined depending on the amounts of the reactants charged. Generally, the elastic modulus and solubility in solvents increase but heat resistance decreases according as the compositional proportion of the Polybutadiene/acrylonitrile copolymer increases.

The block copolymer represented by general formula (Ia) above according to the above-described embodiment can be crosslinked since the phenolic hydroxyl groups contained react readily with various compounds such as isocyanates, isothiocyanates, diketenes, ethyleneimine, epoxy compounds, and the like. It is particularly preferred to carry out crosslinking reaction with epoxy compounds. This is because in this case the crosslinking reaction proceeds under relatively mild conditions, which is advantageous in view of further improvement in heat resistance, adhesiveness, possibility of selection of a wide variety of compounds, reduced cost, ease of handling, and the like.

The epoxy compound which can be reacted with the above-described block copolymer of the present invention is not limited particularly and any compounds that have at least two epoxy groups can be used. For example, there can be cited brominated epoxy compounds, epoxy novolak resins, bisphenol A-epichlorohydrin, multifunctional epoxy compounds, aliphatic epoxy compounds, alicyclic epoxy compounds, fluorine-containing epoxy compounds, and epoxymodified resins. In addition, a great many commercially available compounds can be used according to purposes. Furthermore, catalysts and curing accelerator can be used in combination, if desired.

The block copolymer of the above-described embodiment can be made to have much more increased solvent resistance, adhesiveness and heat resistance by reacting it with the epoxy compounds.

According to another preferred embodiment, the present invention provides a fluorine-containing-polyamide/polybutadiene based block copolymer. This block copolymer comprises a polycondensate comprising a polyamide having an aminoaryl group at each terminal thereof and produced by polycondensation between a fluorine-containing aromatic dicarboxylic acid and an aromatic diamine and a polybutadiene polymer or polybutadiene/acrylonitrile copolymer having a carboxyl group at each terminal thereof, and which is represented by general formula (Ib)

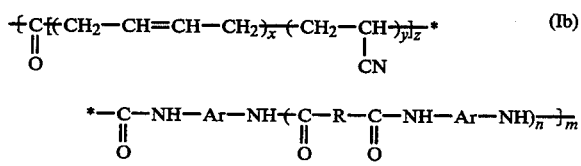 (Ib)

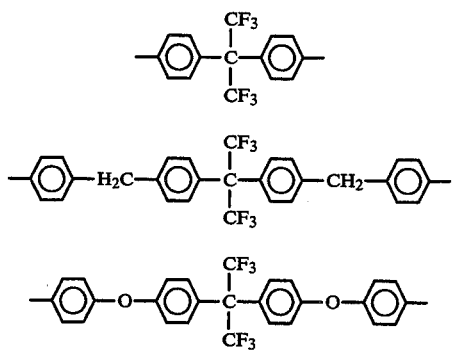

wherein R is a divalent aromatic group, Ar is a divalent aromatic group selected from groups of formulae (1), (2) or (3) below:

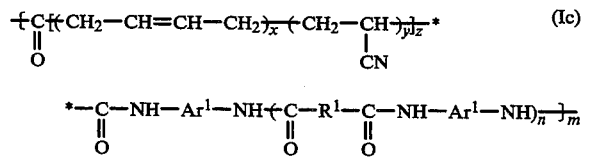
(1)
(2)
(3)

x, y, z, m and n each represent mean degree of polymerization and are integers in the ranges of x=3 to 7, y=0 to 4, z=5 to 15, n=1 to 30, and m=2 to 20, respectively.

According to still another embodiment, there is provided a fluorine-containing-polyamide/polybutadiene based block copolymer represented by general formula (Ic) below:

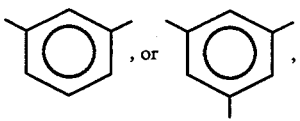 (Ic)

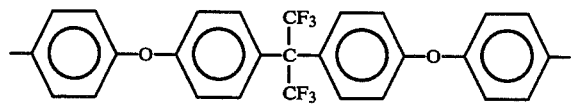

wherein R¹ is a group

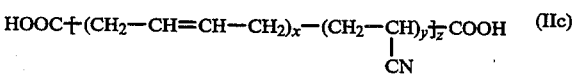, or 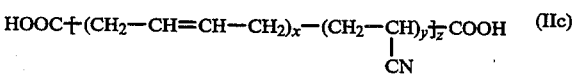,

Ar¹ is a group

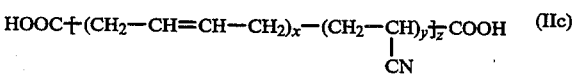

x, y, z, m and n each represent mean degree of polymerization and are integers in the ranges of x=3 to 7, y=0 to 4, z=5 to 15, n=1 to 30, and m=2 to 20, respectively.

The fluorine-containing-polyamide/polybutadiene based block copolymer of general formula (Ic) can be produced by polycondensing a butadiene polymer or acrylonitrile/butadiene copolymer having a carboxyl group at each terminal thereof and represented by general formula (IIc) below:

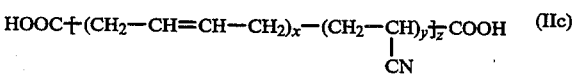 (IIc)

wherein x, y and z each are mean degree of polymerization and are integers in the ranges of x=3 to 7, y=0 to 4, and z=5 to 15, with a polyamide having an aminoaryl group at each terminal thereof and represented by general formula (IIIc) below:

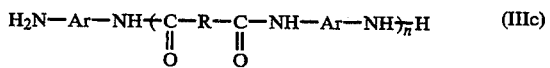 (IIIc)

wherein R is a divalent aromatic group, Ar is a divalent aromatic group represented by formula (1), (2) or (3) below:

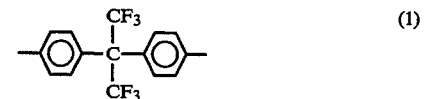
(1)
(2)
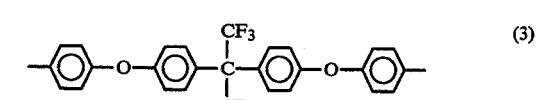
(3)

n is mean degree of polymerization and is an integer in the range of n=1 to 30, in the presence of an aromatic phosphite and a pyridine derivative.

In the reaction between the compounds of formulae (IIc) and (IIIc), there can be used essentially the same procedures and reaction conditions as those used in the reaction between the polybutadiene/acrylonitrile copolymer of general formula (II) and the polyamide of formula (III) above, and specific explanation is omitted here.

As for the aromatic diamine having a fluorine-containing alkyl group as a substituent on its main chain and represented by general formula (IV) above, there can be used, for example, 2,2-bis (4-aminophenyl)hexafluoropropane, 2,2-bis (4-aminophenoxyphenyl)hexafluoropropane and 2,2-bis(3-amino-4-methylphenyl)hexafluoropropane As for the dicarboxylic acid represented by general formula (V) above, there can be cited, for example, isophthalic acid, 5-hydroxyisophthalic acid, terephthalic acid, 4,4'-biphenyldicarbonylic acid, 3,3'-methylenedibenzoic acid, 4,4'-methylenedibenzoic acid, 4,4'-oxydibenzoic acid, 4,4'-thiodibenzoic acid, 3,3'-carbonyldibenzoic acid, 4,4'-carbonyldibenzoic acid, 4,4'-sulfonyldibenzoic acid, 1,4-naphthalenedicarboxylic acid, 1,5-naphthalenedicarboxylic acid, 2,6-naphthalenedicarboxylic acid, 2,2-bis(4-carboxyphenyl)hexafluoropropane, and the like.

The fluorine-containing-polyamide/polybutadiene based block copolymer of the present invention has good solubility in solvents and compatibility with other resins, excellent handleability, and shows low water absorption, moisture absorption and dielectric constant, and therefore it is useful as a material of a wide applicability.

EXAMPLE

Hereafter, the present invention will be described in greater detail with reference to examples. However, the present invention should not be construed as being limited to the examples.

Example 1

In a 100 ml three-neck flask fitted with a reflux condenser and nitrogen introducing tube were charged 1.23 g (7.41 mmol) of isophthalic acid, 1.58 g (7.89 mmol) of 3,4'-oxydianiline, 0.33 g of lithium chloride, 1.01 g of calcium chloride, 20 ml of N-methyl-2-pyrrolidone and 2.5 ml of pyridine. After stirring the mixture to form a solution, 6.2 g of triphenyl phosphite was added to the solution and reacted at 80° C. for 2 hours to form an amide. To this was added a solution in 30 ml of pyridine of 0.62 g of polybutadiene/acrylonitrile copolymer having a carboxyl group at each terminal thereof represented by general formula (If) above in which x=5, y=10, and z=4(Hycar CTBN, produced by BF Goodrich Co.), and the mixture was reacted for additional 3 hours, followed by cooling at room temperature. To the reaction mixture thus obtained was added 500 ml of methanol to deposit a polyamide/polybutadiene/acrylonitrile block copolymer of which the content of polybutadiene/acrylonitrile copolymer component is about 20% by weight. The deposit was refluxed with methanol, purified by washing with methanol, and dried to obtain the polyamide/polybutadiene/acrylonitrile block copolymer of the present invention.

The block copolymer had an intrinsic viscosity of 0.49 dl/g (measured at a concentration of 0.5 g/dl in N,N-dimethylacetamide at 30° C., hereafter the same). FIG. 1 shows an infrared spectrum of the block copolymer. With respect to wave number which corresponds to the chemical structure of the block copolymer, there is observed an absorption corresponding to C—N bond at 2240 cm$^{-1}$, and an absorption corresponding to C=O bond in —NHC (=O)— at 1660 cm$^{-1}$.

Example 2

Polycondensation, purification and drying were carried out in the same manner as in Example 1 except that the amount of the polybutadiene/acrylonitrile copolymer having a carboxyl group at each terminal thereof was changed to 2.60 g to obtain a polyamide/poiybutadiene/acrylonitrile block copolymer of which the content of poiybutadiene/acrylonitrile copolymer component was about 50% by weight.

Figure 2:
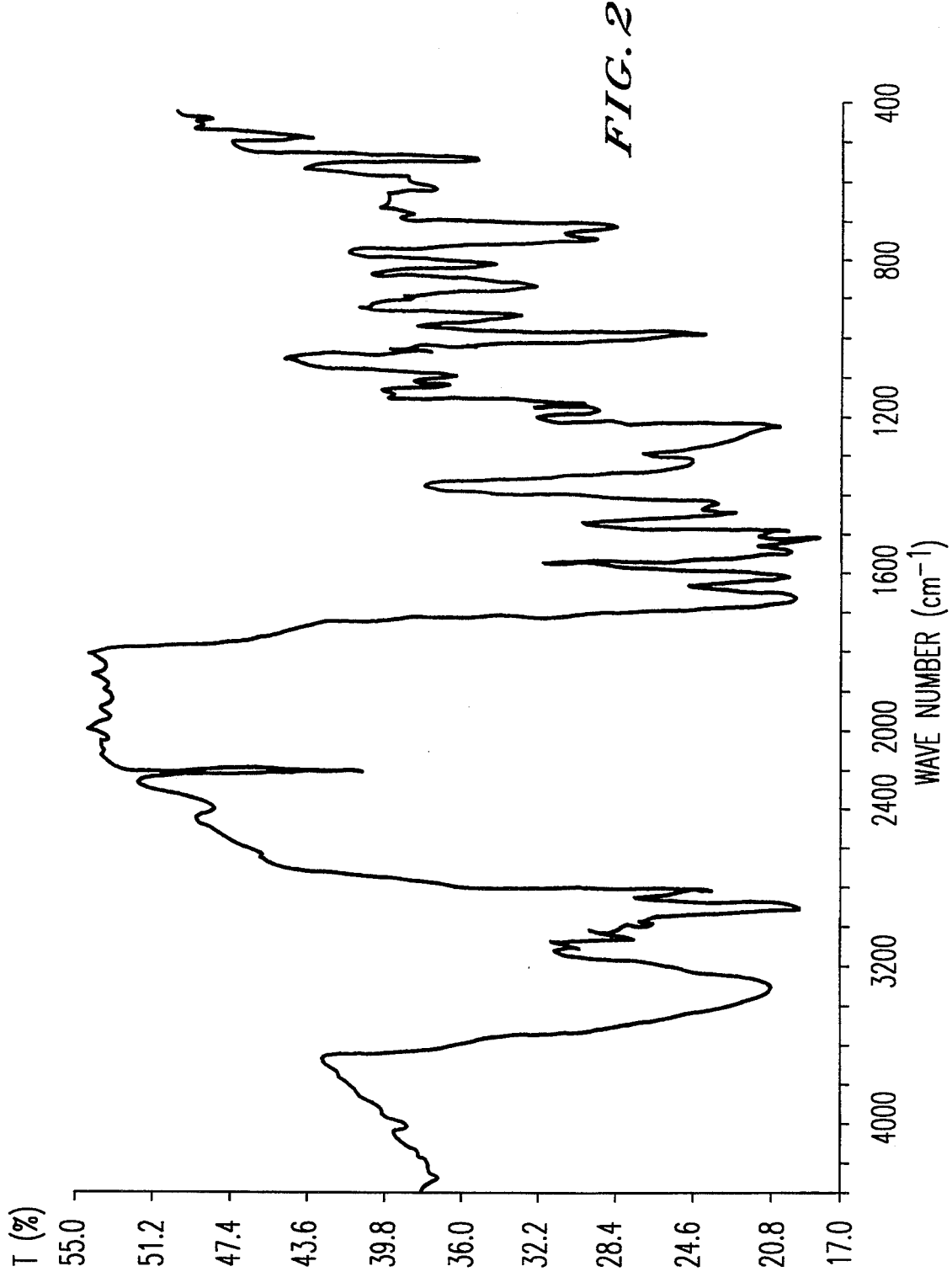

The block copolymer had an intrinsic viscosity of 0.94 dl/g (N,N-dimethylacetamide, 30° C.). FIG. 2 shows an infrared spectrum of the block copolymer. With respect to wave number which corresponds to the chemical structure of the block copolymer, there is observed an absorption corresponding to C—N bond at 2240 cm$^{-1}$, and an absorption corresponding to C=O bond in —NHC(=O)— at 1660 cm$^{-1}$

Example 3

Polycondensation, purification and drying were carried out in the same manner as in Example 1 except that the amount of the polybutadiene/acrylonitrile copolymer having a carboxyl group at each terminal thereof was changed to 11.24 g to obtain a polyamide/polybutadiene/acrylonitrile block copolymer of which the content of polybutadiene/acrylonitrile copolymer component was about 80% by weight.

Figure 3:
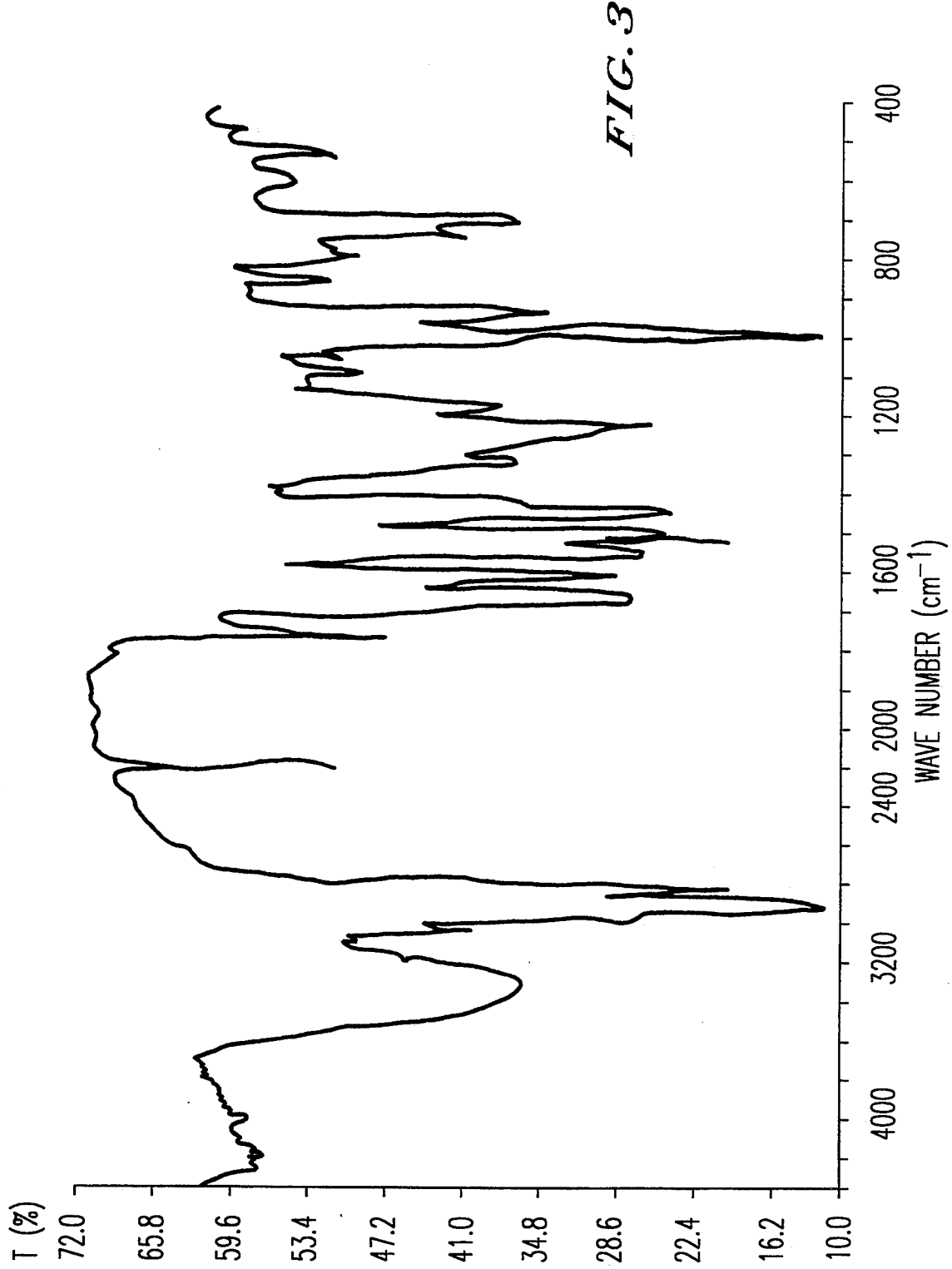

The block copolymer had an intrinsic viscosity of 0.60 dl/g (N,N-dimethylacetamide, 30° C.), FIG. 3 shows an infrared spectrum of the block copolymer. With respect to wave number which corresponds to the chemical structure of the block copolymer, there is observed an absorption corresponding to C—N bond at 2240 cm$^{-1}$, and an absorption corresponding to C=O bond in —NHC (=0)—at 1660 cm$^{-1}$

Comparative Example 1

Polycondensation, purification and drying were carried out in the same manner as in Example 1 except that a polybutadiene having a carboxyl group at each terminal thereof (Hycar CTB, mean molecular weight of 3,600, produced by BF Goodrich Co.) was used in place of the polybutadiene/acrylonitrile copolymer having a carboxyl group at each terminal thereof to obtain a polyamide/polybutadiene block copolymer of which the content of polybutadiene/acrylonitrile copolymer component was about 20% by weight.

Comparative Example 2

Polycondensation, purification and drying were carried out in the same manner as in Example 2 except that the polybutadiene/acrylonitrile copolymer having a carboxyl group at each terminal thereof was replaced by the polybutadiene having a carboxyl group at each terminal thereof as used in Comparative Example 1 to obtain a polyamide/polybutadiene block copolymer of which the content of polybutadiene/acrylonitrile copolymer component was about 50% by weight.

Comparative Example 3

Polycondensation, purification and drying were carried out in the same manner as in Example 3 except that the polybutadiene/acrylonitrile copolymer having a carboxyl group at each terminal thereof was replaced by the the polybutadiene having a carboxyl group at each terminal thereof as used in Comparative Example 1 to obtain a polyamide/polybutadiene block copolymer of which the content of polybutadiene/acrylonitrile copolymer component was about 80% by weight.

The polyamide/polybutadiene/acrylonitrile block copolymers according to Examples 1 to 3 and polyamide/polybutadiene block copolymers according to Comparative Examples 1 to 3 thus obtained were examined for their solubility in solvents, compatibility with epoxy resins and Young's modulus.

In tests for the solubility in solvents, rate of dissolution in N, N-dimethylacetamide at room temperature of each of the block copolymers was examined (O : rate of dissolution was high, Δ: soluble but rate of dissolution was low). In tests for compatibilily, compatibility with hisphenol type epoxy resin (EPIKOTE 1001, produced by Yuka Shell Epoxy Co. ) was examined (O : good compatibility, Δ: partially opaque, bad compatibility). Young's modulus (dyne/cm$^2$) of the resins was measured on a 0.03 mm-thick film at room temperature and at 110 Hz using Rheovibron (automatic viscoelastometer, produced by Orientech Co.). The results obtained are shown in Table I.

TABLE 1

| Block Copolymer | Rate of Dissolution | Compatibility | Young's Modulus (log(dyne/cm$^2$)) |
|---|---|---|---|
| Example 1 | ○ | ○ | 9.8 |
| Example 2 | ○ | ○ | 10.0 |
| Example 3 | ○ | ○ | — |
| Comp. Ex. 1 | Δ | Δ | 9.7 |
| Comp. Ex. 2 | Δ | Δ | 9.4 |
| Comp. Ex. 3 | Δ | Δ | 8.0 |

Example 4

In a 50 ml three-neck flask fitted with a reflux condenser and nitrogen introducing tube were charged 167 mg (1 retool) of isophthalic acid, 440 mg (2. 2 mmol) of 3,4'-oxydianiline, 182 mg (1 mmol) of 5-hydroxyisophthalic acid (about 50% by mole based on total aromatic dicarboxylic acid), 100 mg of lithium chloride, 300 mg of calcium chloride, 8 ml of N-methyl-2-pyrrolidone and 1 ml of pyridine. After stirring the mixture for dissolution, 1 g of triphenyl phosphite was added thereto and reacted at 90° C. for 2 hours to produce a polyamide. To this was added a solution in 5 ml of pyridine of 810 mg of polybutadiene/acrylonitrile copolymer having a carboxyl group at each terminal thereof (Hycar CTBN, produced by BF Goodrich Co.), and the mixture was reacted for additional 3 hours, followed by cooling to room temperature. The reaction mixture thus obtained was poured into 500 ml of methanol to deposit a polyamide/polybutadiene/acrylonitrile block copolymer having a phenolic hydroxyl group of which the content of polybutadiene/acrylonitrile copolymer component is 50% by weight. The deposited block copolymer was further purified by washing with methanol and refluxing with methanol.

Figure 4:
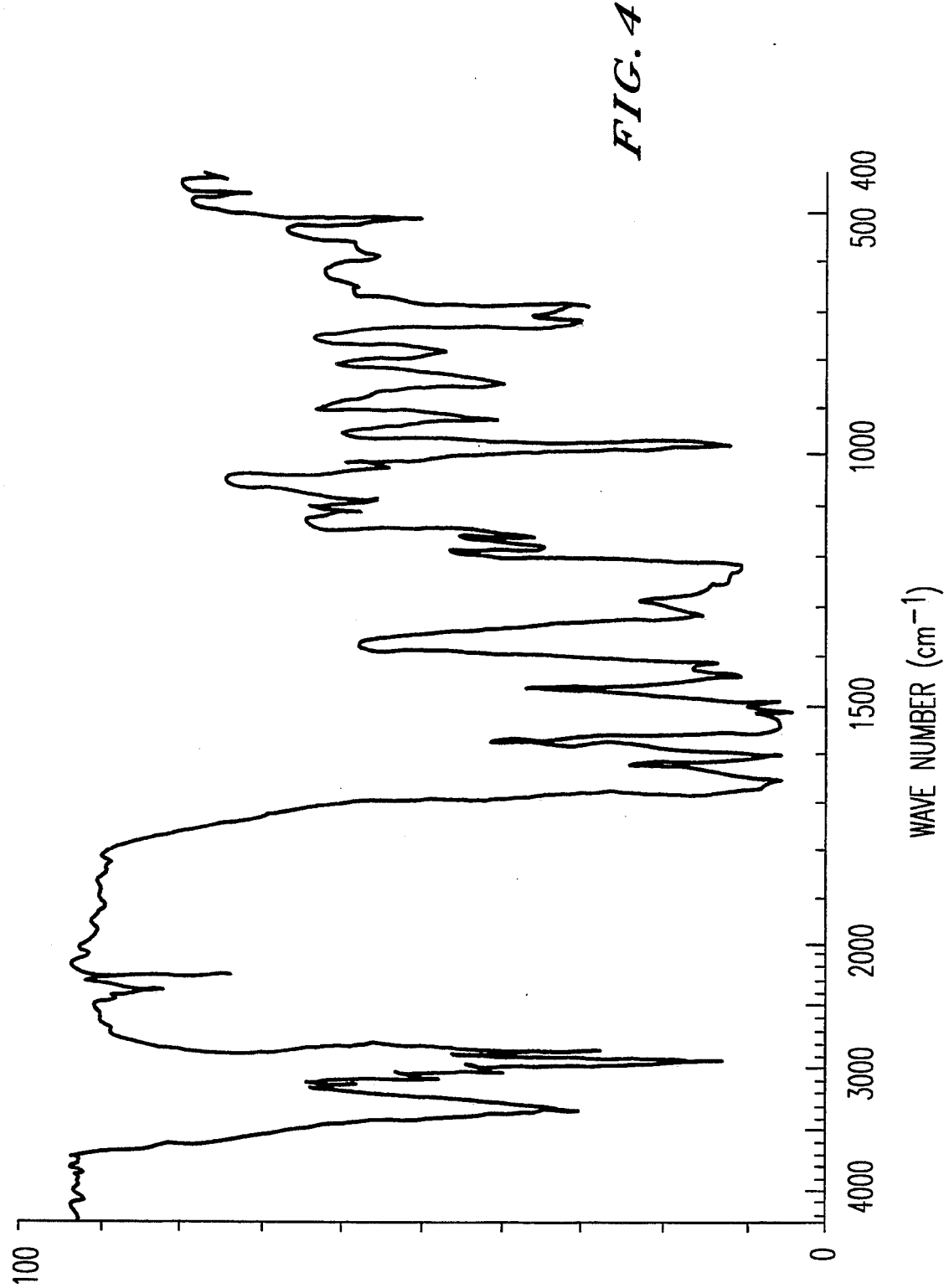

The block copolymer had an intrinsic viscosity of 1.2.5 dl/g (N,N-dimethylacetamide, 30° C.). FIG. 4 shows an infrared spectrum of the block copolymer. With respect to wave number which corresponds to the chemical structure of the block copolymer, there is observed an absorption corresponding to C—N bond at 2243 cm$^{-1}$, and an absorption corresponding to C=O bond in —NHC(=O)— at 1657 cm$^{-1}$.

Example 5

Polycondensation, purification and drying were carried out in the same manner as in Example 4 except that the amount of the polybutadiene/acrylonitrile copolymer having a carboxyl group at each terminal thereof was changed to 200 mg to obtain a polyamide/polybutadiene/acrylonitrile block copolymer having a phenolic hydroxyl group of which the content of polybutadiene/acrylonitrile copolymer component was 50% by weight.

Figure 5:
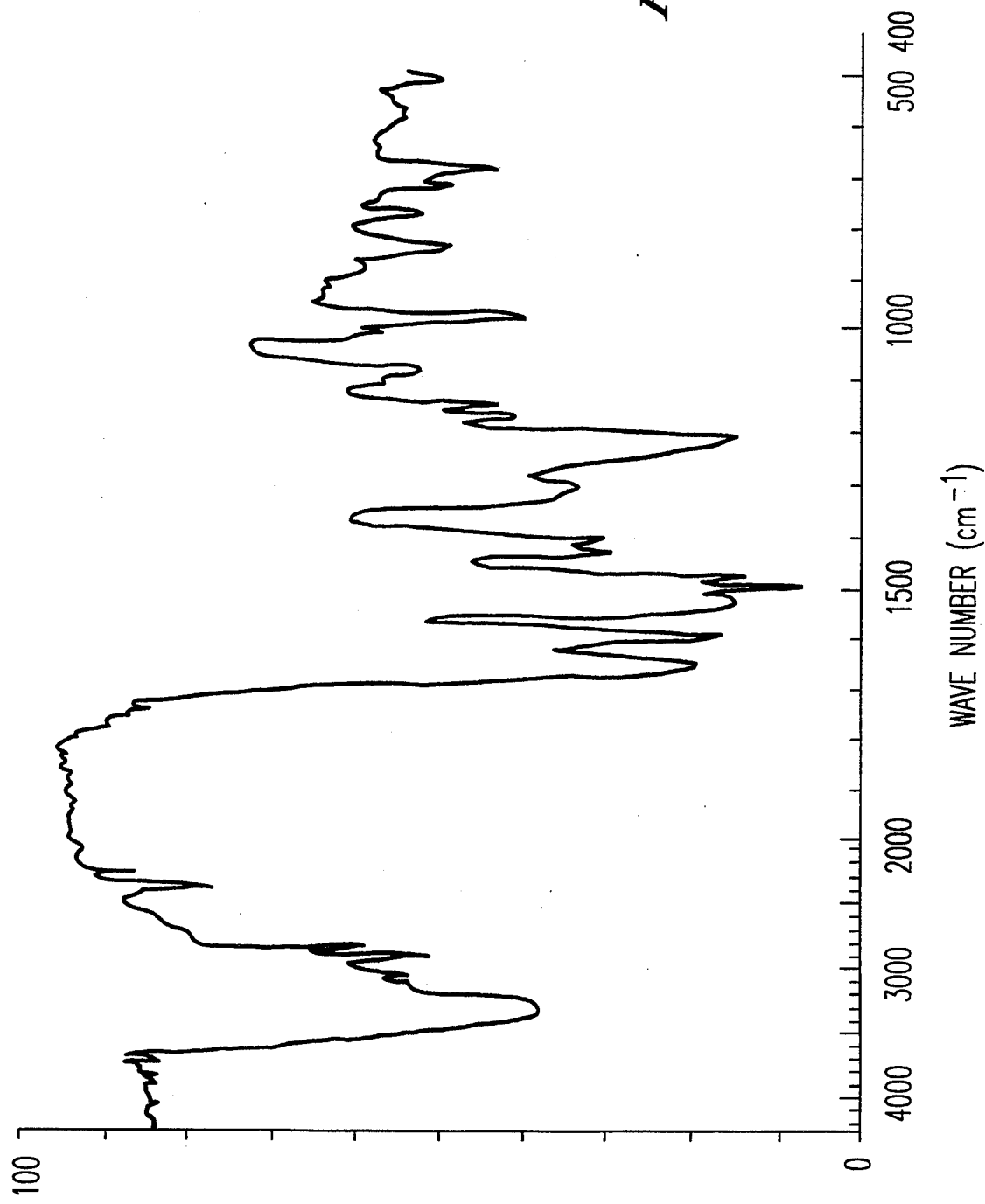

The block copolymer had an intrinsic viscosity of 0.65 dl/g (N,N-dimethylacetamide, 30° C.). FIG. 5 shows an infrared spectrum of the block copolymer. With respect to wave number which corresponds to the chemical structure cf the block copolymer, there is observed an absorption corresponding to C—N bond at 2240 cm$^{-1}$, and an absorption corresponding to C=O bond in —NHC(=O)— at 1662 cm$^{-1}$.

Example 6

A polyamide/polybutadiene/acrylonitrile block copolymer having a phenolic hydroxyl group of which the content of polybutadiene/acrylonitrile copolymer component was 50% by weight was obtained in the same manner as in Example 4 except that the amount of the 5-hydroxyisophthalic acid was changed to 109 mg (0.6 mmol) of 5-hydroxyisophthalic acid (about 30% by mole based on total aromatic dicarboxylic acid) and that the amount of isophthalic acid was changed to 234 mg (1.4 mmol).

Figure 6:
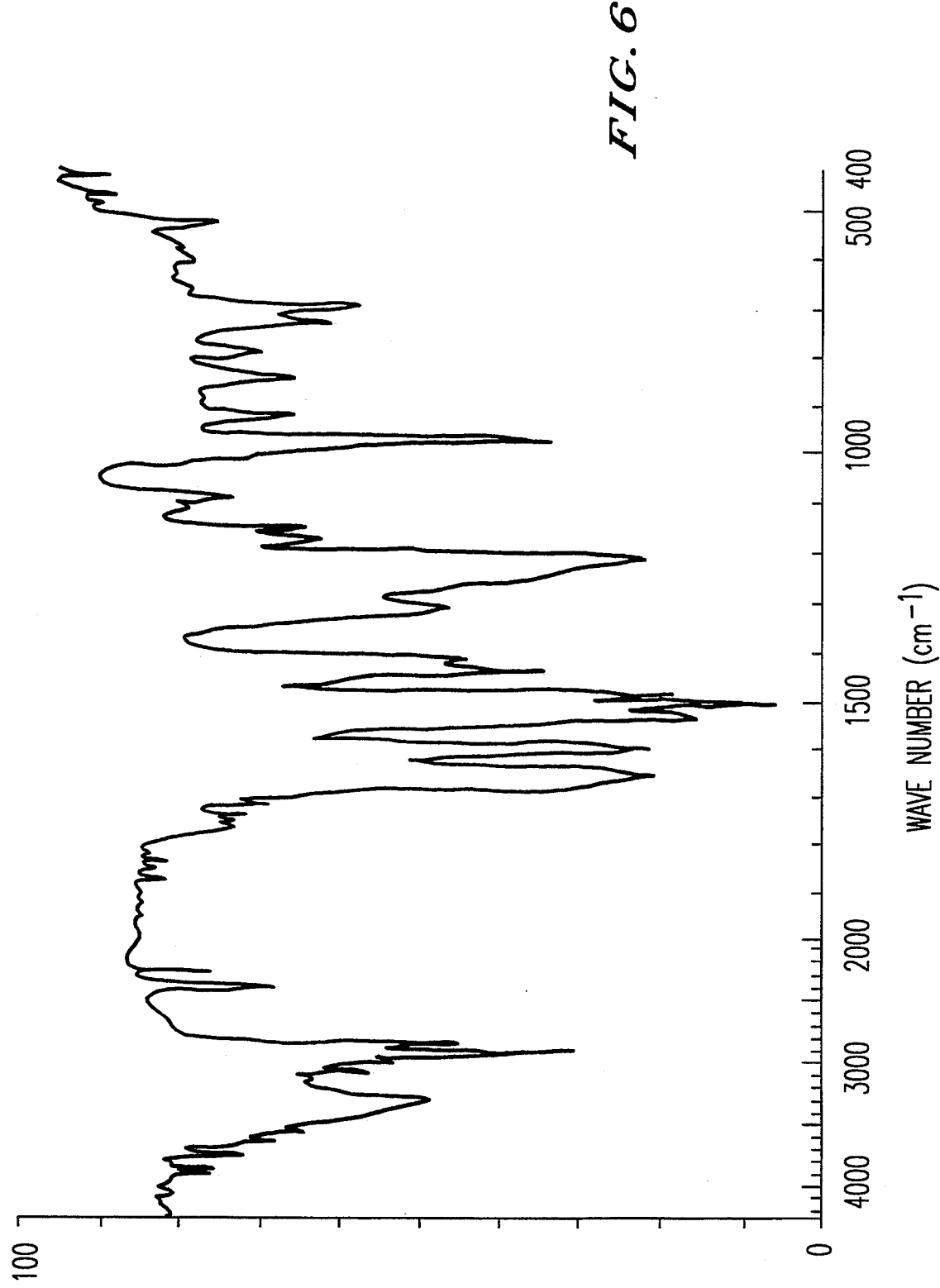

The block copolymer hag an intrinsic viscosity of 0.60 dl/g (N, N-dimethylacetamide, 30° C.). FIG. 6 shows an infrared spectrum of the block copolymer. With respect to wave number which corresponds to the chemical structure of the block copolymer, there is observed an absorption corresponding to C—N bond at 2238 cm$^{-1}$, and an absorption corresponding to C=O bond in —NHC(=O)— at 1660 cm$^{-1}$.

Example 7

A polyamide/polybutadiene/acrylonitrile block copolymer having a phenolic hydroxyl group of which the content of polybutadiene/acrylonitrile copolymer component was 50% by weight was obtained in the same manner as in Example 4 except that the amount of the 5-hydroxyisophthalic acid was changed to 36 mg (0.2 mmol) of 5-hydroxyisophthalic acid (about 30% by mole based on total aromatic dicarboxylic acid) and that the amount of isophthalic acid was changed to 301 mg (1.8 mmol).

Figure 7:
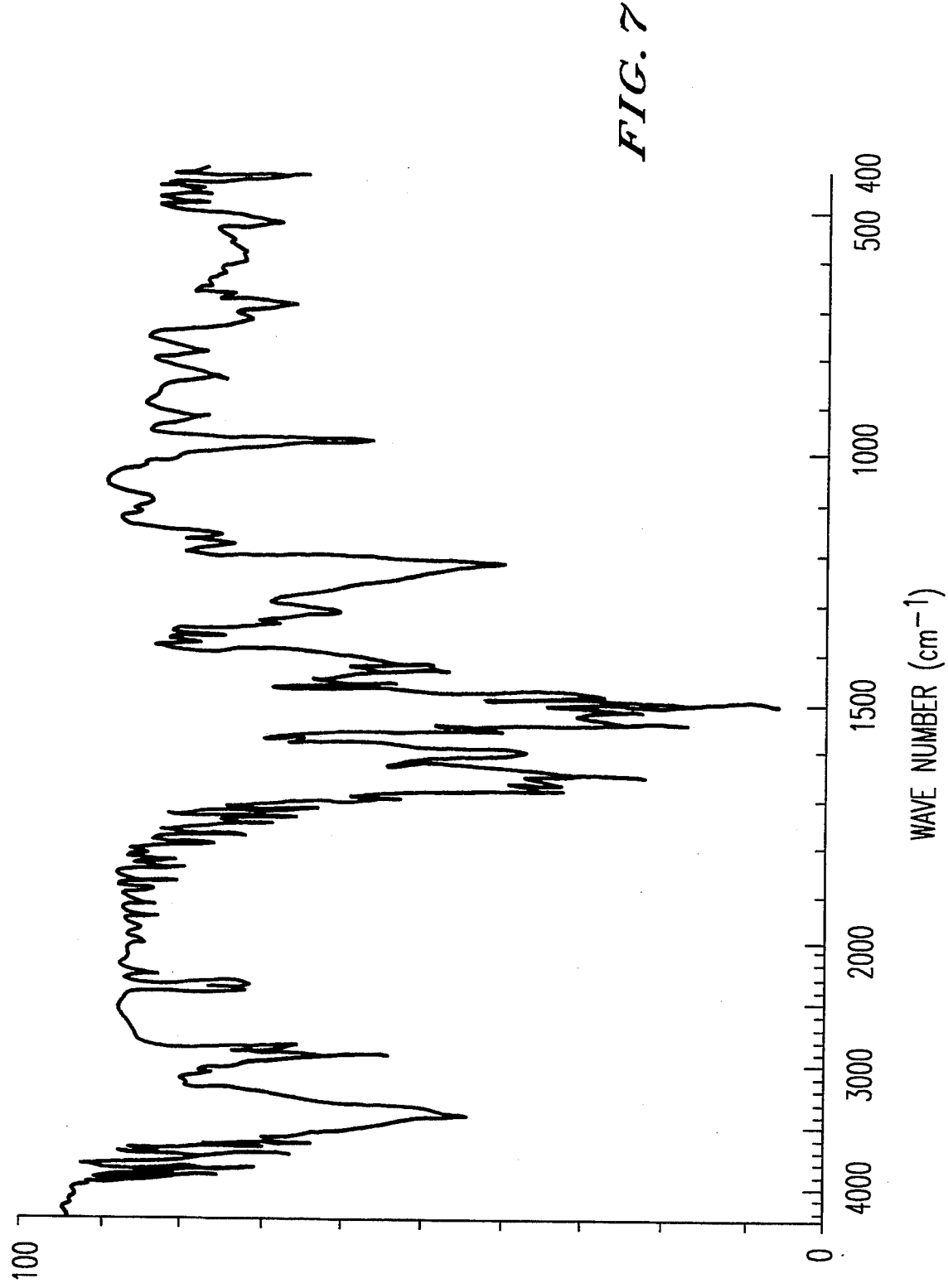

The block copolymer had an intrinsic viscosity of 0.60 dl/g (N,N-dimethylacetamide, 30° C.). FIG. 7 shows an infrared spectrum of the block copolymer. With respect to wave number which corresponds to the chemical structure of the block copolymer, there is observed an absorption corresponding to C—N bond at 2241 cm$^{-1}$, and an absorption corresponding to C=O bond in —NHC (=O)—at 1659 cm$^{-1}$.

Application Example

The polyamide/polybutadiene/acrylonitrile block copolymer having a phenolic hydroxyl group obtained in Example 4 (2 g) and 0.6 g of a bisphenol-type epoxy compound (EPIKOTE 828, produced by Yuka Shell Co.) were dissolved in 6 ml of N,N-dimethylacetamide, and the solution was coated on a glass substrate and dried, followed by heating at 180° C. for 3 hours for reaction. The film of the epoxy-modified polyamide/polybutadiene/acrylonitrile block copolymer thus obtained was insoluble in N,N-dimethylacetamide although it swelled only slightly. It was also observed that the adhesiveness of the film was improved remarkably.

Figure 8:
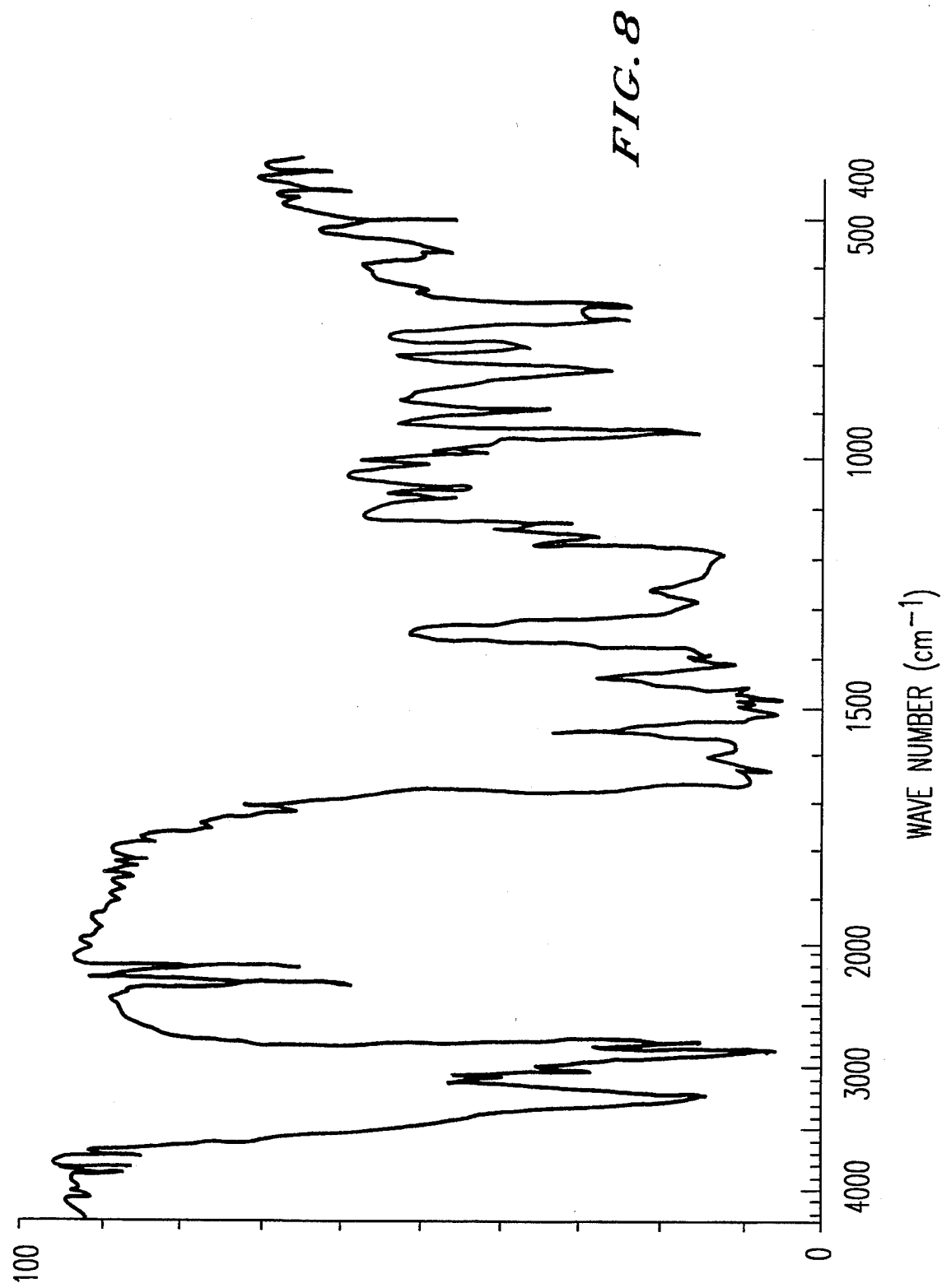
FIG. 8 is a graph showing infrared absorption spectrum of polyamide/polybutadiene/acrylonitrile block copolymer according to Example 4 when mixed with an epoxy compound.
Figure 9:
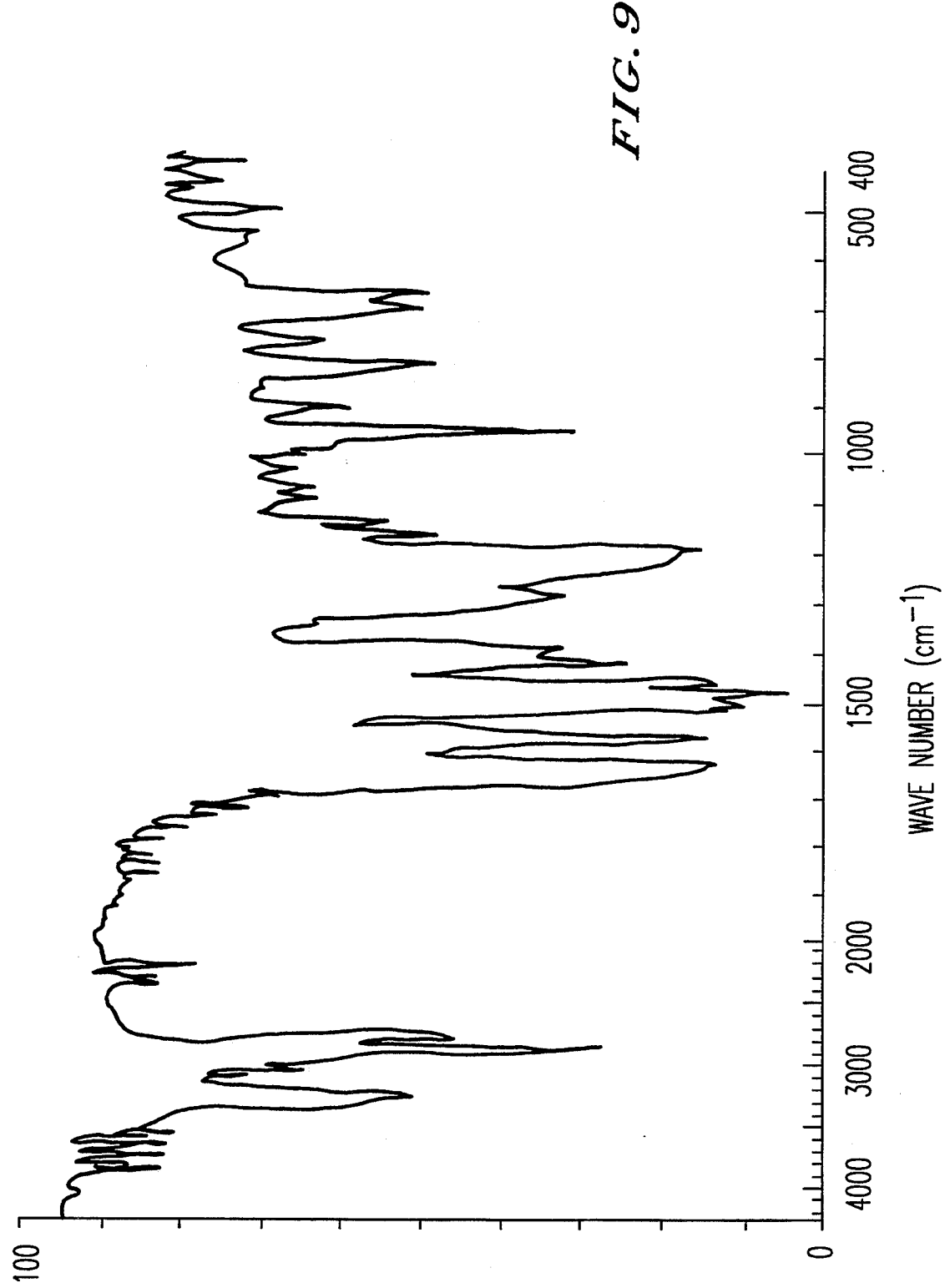
FIG. 9 is a graph showing infrared absorption spectrum of polyamide/polybutadiene/acrylonitrile block copolymer after being mixed with an epoxy compound and heated to modify it.

FIG. 8 is a graph showing an infrared absorption spectrum of a film made of a mixture of the polyamide/polybutadiene/acrylonitrile block copolymer and the epoxy compound. FIG. 9 is a graph showing an infrared absorption spectrum of the film after react ion by heat treatment (180° C., 3 hours). FIGS. 8 and 9 clearly show that absorptions near 1400 cm−1 and 3300 cm−1 which are absorptions ascribable to phenolic hydroxyl group before the heat reaction have decreased relatively after the heat reaction, which suggests that the phenolic hydroxyl group and the epoxy compound reacted with each other.

Example 8

Figure 10:
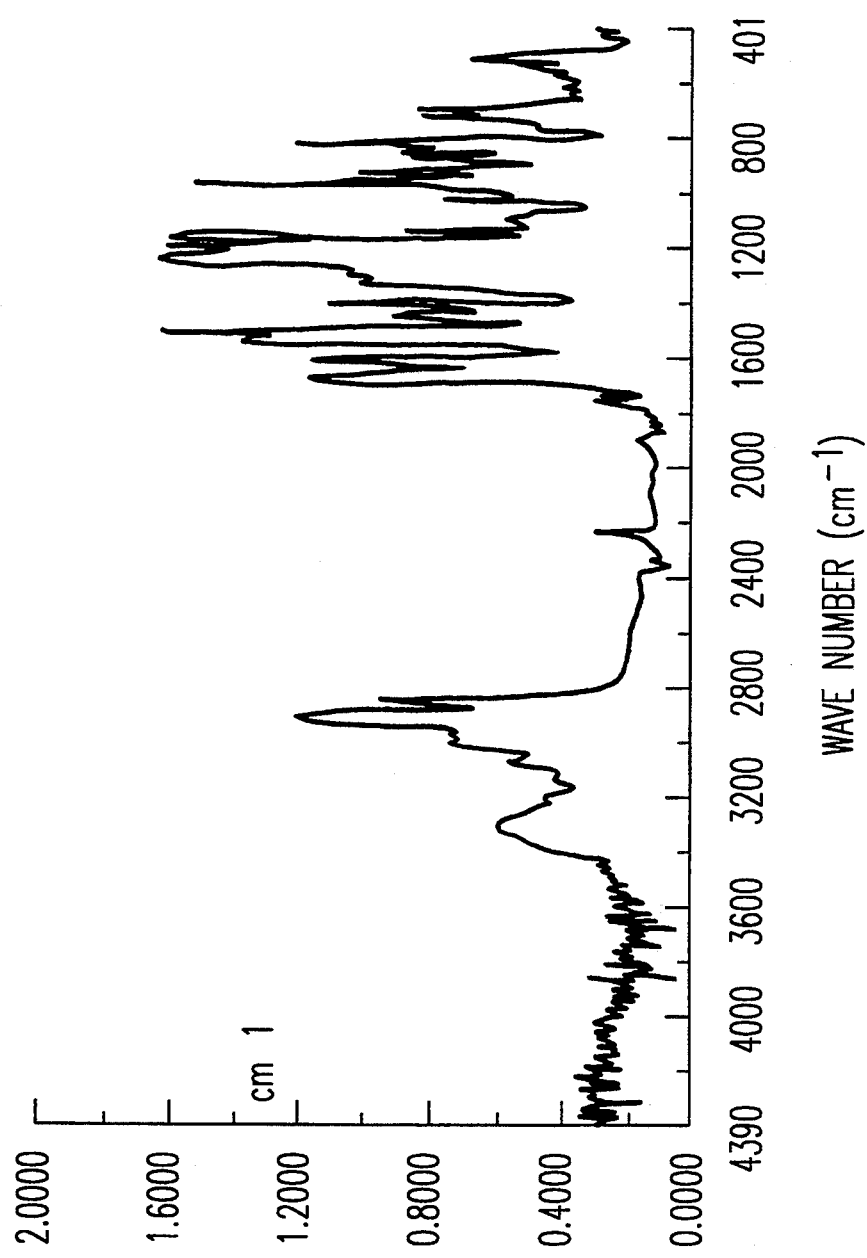
FIGS. 10 to 12 are graphs showing infrared absorption spectra of polyamide/polybutadiene based block copolymers according to Examples 8 to 10, respectively.

In a 50 ml three-neck flask fitted with a reflux condenser and nitrogen introducing tube were charged 1.58 g (9.5 mmol) of isophthalic acid, 5.18 g (10 mmol) of 2,2-bis(4-aminophenoxyphenyl) hexafluoropropane, lithium chloride, 1.1 g of calcium chloride, 20 ml of N-methyl-2-pyrrolidone and 3 ml of pyridine. After stirring the mixture to form a solution, 6.2 g of triphenyl phosphite was added to the solution and reacted at 110° C. for 3 hours to form a fluorine-containing polyamide. To the polyamide was added a solution in 20 ml of pyridine of 6.22 g of polybutadiene/acrylonitrile copolymer having a carboxyl group at each terminal thereof and represented by general formula (II) above in which x=5, y=10, and z=4 (Hycar CTBN, produced by BF Goodrich Co. ), and the mixture was reacted for additional 4 hours, followed by cooling to room temperature. The reaction mixture obtained was poured into 500 ml of methanol to deposit a flurorine-containing-polyamide/polybutadiene based block copolymer of which the content of polybutadiene/acrylonitrile copolymer component is 50% by weight. The deposited polymer was washed with methanol and refluxed with methanol for purification, The block copolymer thus obtained had an intrinsic viscosity of 0.64 dl/g (N,N-dimethylacetamide, 30° C.). FIG. 10 shows an infrared spectrum of the block copolymer.

Example 9

A polyamide was produced in the same manner as in Example 8 except that the amount of the isophthalic acid was changed to 0.75 g (4.5 mmol) and further 0.82 g (4.5 mmol) of 5-hydroxyisophthalic acid was added thereto and then there was prepared in the same manner a fluorine-containing-polyamide/polybutadiene/acrylonitrile based block copolymer having a phenolic hydroxyl group of which the content of polybutadiene/acrylonitrile copolymer component was 50% by weight.

Figure 11:
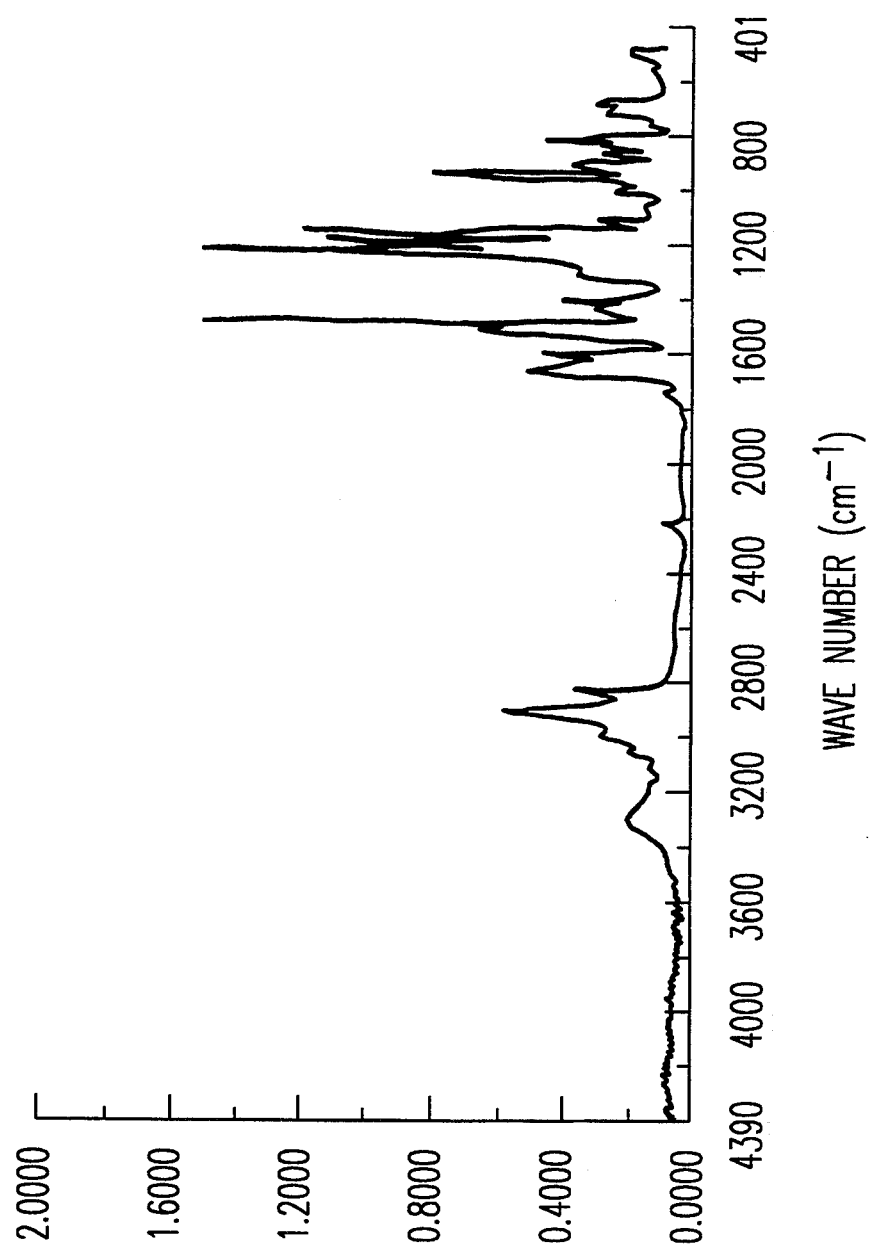

The block copolymer had an intrinsic viscosity of 0.37 dl/g (N,N-dimethylacetamide, 30° C.). FIG. 11 shows an infrared absorption spectrum of the block copolymer.

Example 10

A polyamide was produced i n the same manner as in Example 9 except that the amount of 5-hydroxyisophthalic acid was changed to 0.08 g (0.45 mmol) and the amount of isophthalic acid was changed to 0.67 g (4.05 mmol), and then there was prepared in the same manner a fluorine-containing-polyamide/polybutadiene/acrylonitrile based block copolymer having a phenolic hydroxyl group of which the content of polybutadiene/acrylonitrile copolymer component was 50% by weight.

Figure 12:
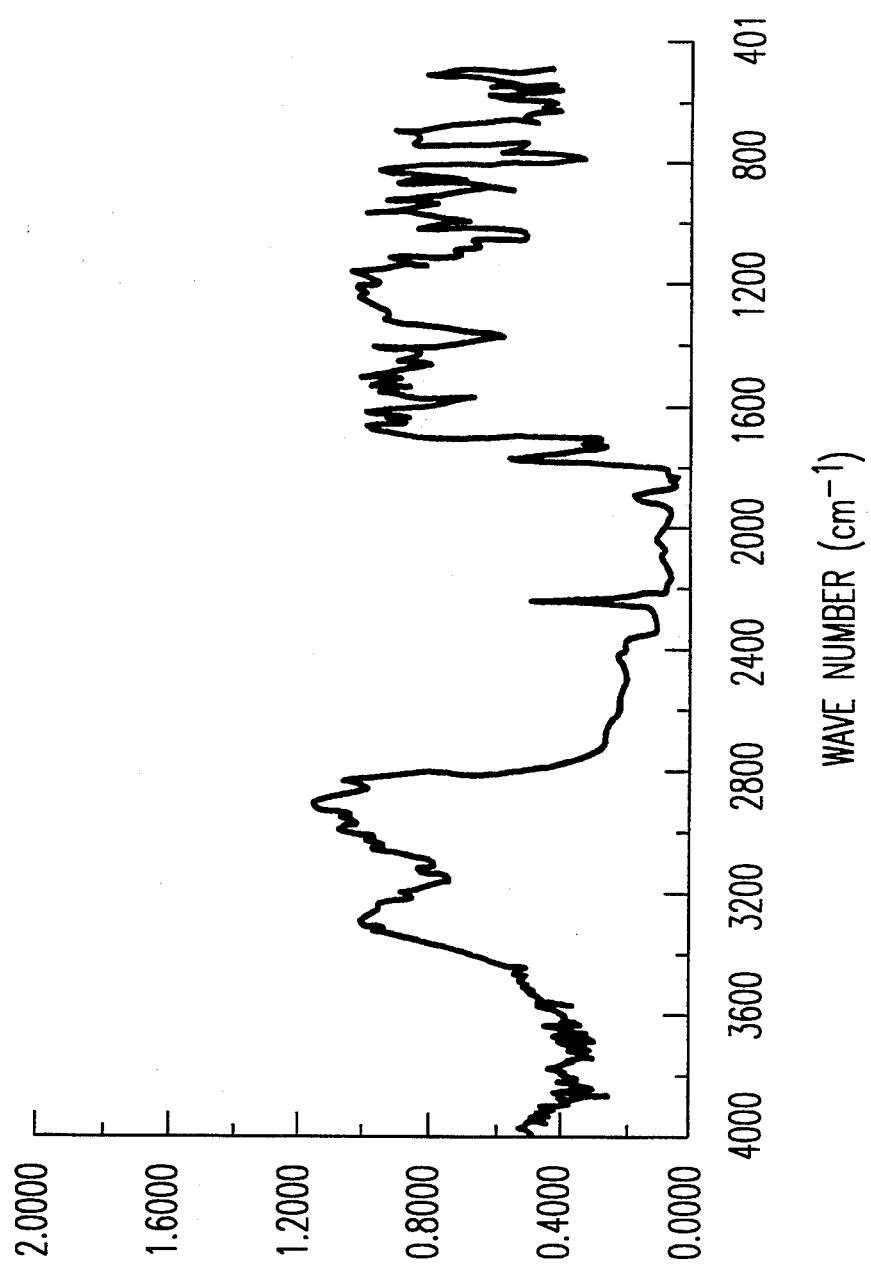

The block copolymer had an intrinsic viscosity of 0.38 dl/g (N,N-dimethylacetamide, 30° C.). FIG. 12 shows an infrared absorption spectrum of the block copolymer.

Example 11

In a 50 ml three-neck flask fitted with a reflux condenser and nitrogen introducing tube were charged 0.83 g (5.0 mmol) of isophthalic acid, 0.91 g (5.0 mmol) of 2,2-bis(4-aminophenoxyphenyl)hexafluoropropane, 0.3 g lithium chloride, 1.1 g of calcium chloride, 20 ml of N-methyl-2-pyrrolidone and 3 ml of pyridine. After stirring the mixture for dissolution, 6.2 g of triphenylphosphite was added to the solution and reacted at 110° C. for 3 hours to form a fluorine-containing polyamide. To the polyamide was added a solution in 20 ml of pyridine of 3.60 g of polybutadiene having a carboxyl group at each terminal thereof (Hycar CTB, produced by BF Goodrich Co.), and the mixture was reacted for additional 4 hours, followed by cooling to room temperature. The reaction mixture thus obtained was poured into 500 ml of methanol to deposit a flurorine-containing-polyamide/polybutadiene block copolymer of which the content of polybutadiene component is 32% by weight. The deposited polymer was purified by washing with methanol and refluxing with methanol.

Figure 13:
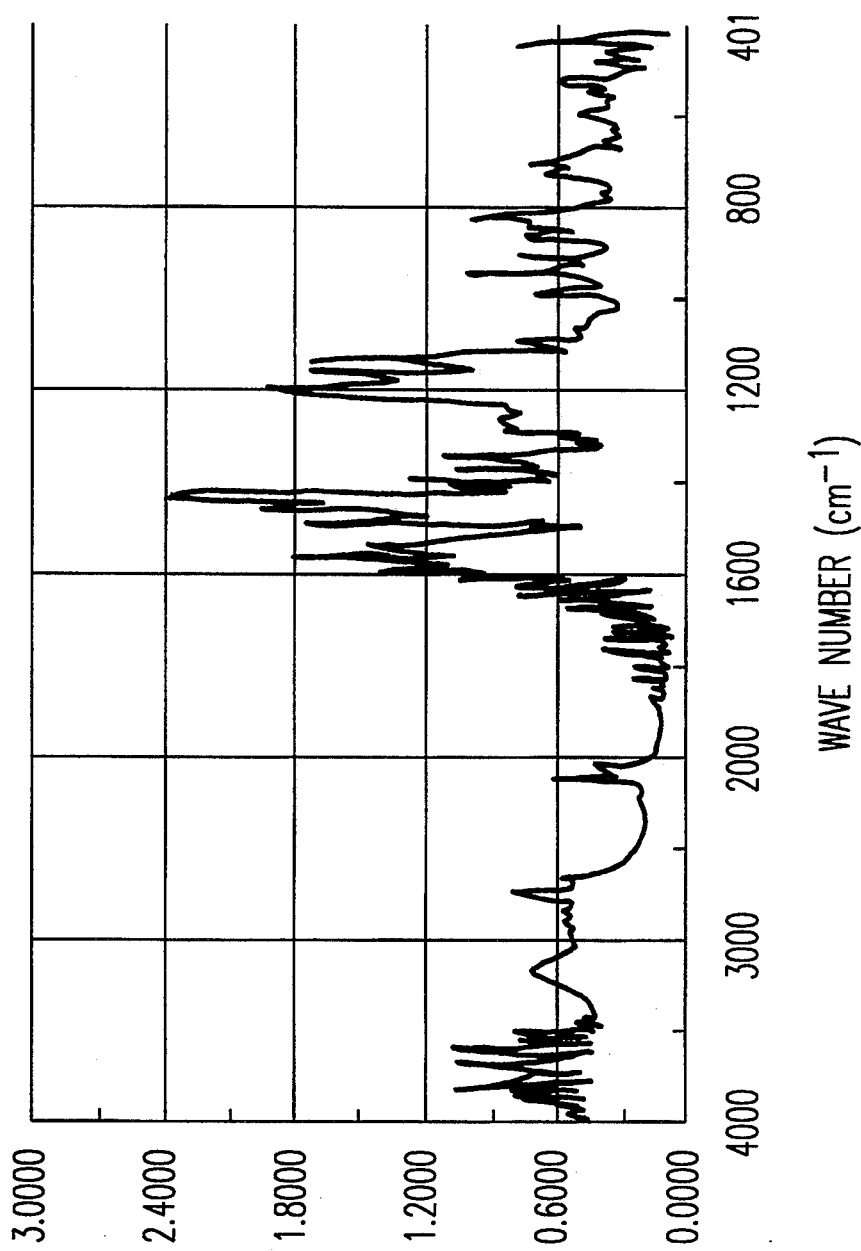
FIG. 13 is a graph showing infrared absorption spectrum of polyamide/polybutadiene based block copolymer according to Example 11.

The block copolymer thus obtained had an intrinsic viscosity of 0. 26 dl/g (N,N-dimethylacetamide, 30° C.). FIG. 13 shows an infrared absorption spectrum of the resulting resin.

Comparative Example 4

A polyamide was produced in the same manner as in Example 8 except that 2,2-bis(4-aminophenoxyphenyl)hexafluoropropane was replaced by 2.00 g (10 mmol) of 3,4'-oxydianiline and then there was prepared in the same manner a fluorine-containing-polyamide/polybutadiene/acrylonitrile based block copolymer of which the content of polybutadiene/acrylonitrile copolymer component was 50% by weight. The block copolymer had an intrinsic viscosity of 0.94 dl/g (N,N-dimethylacetamide, 30° C.).

Comparative Example 5

A polyamide was produced in the same manner as in Example 9 except that 2,2-bis(4-aminophenoxyphenyl)hexafluoropropane was replaced by 2.00 g (10 mmol) of 3,4'-oxydianiline and then there was prepared in the same manner a fluorine-containing-polyamide/polybutadiene/acrylonitrile block copolymer of which the content of polybutadiene/acrylonitrile copolymer component was 50% by weight. The block copolymer had an intrinsic viscosity of 1.25 dl/g (N,N-dimethylacetamide, 30° C.).

Comparative Example 6

A polyamide was produced in the same manner as in Example 10 except that 2,2-bis(4-aminophenoxyphenyl)hexafluoropropane was replaced by 2.00 g (10 mmol) of 3,4'-oxydianiline and then there was prepared in the same manner a fluorine-containing-polyamide/polybutadiene/acrylonitrile block copolymer of which true content of polybutadiene/acrylonitrile copolymer component was 50% by weight. The block copolymer had at, intrinsic viscosity of 0.37 dl/g (N,N-dimethylacetamide, 30° C.).

The block copolymers according to Examples 8 to 10 and Comparative Examples 4 to 6 thus obtained were examined for their moisture absorption and dielectric constant, and the results are shown in Table 2 below.

Moisture absorption was measured by measuring the mass of a film made of the block copolymer weighing about 30 mg after leaving it to stand in a desiccator at a humidity of 0% (desiccant: P2O5 was used) until the its mass does not decrease, and then further measuring its mass after leaving it to stand in a desiccator at a humidity of 66% (humidity was controlled using a saturated aqueous solution of NaNO2 until no change in mass does occur. The moisture absorption was calculated according to the following formula:

$$\text{Moisture absorption} = \frac{(\text{wet mass} - \text{dry mass})}{\text{dry mass}} \times 100$$

On the other hand, dielectric constant was obtained by measuring the capacitance of a film (5 cm×5 cm) made of the block copolymer on both surfaces of which is deposited an aluminum electrode by vapor deposition at room temperature and at 110 Hz using a device for measuring dielectric loss (TRS-10T type, Ando Electric Co., Ltd.). The results obtained are shown in Table 2 below.

TABLE 2

|  | Moisture Absorption | Dielectric Constant |
| --- | --- | --- |
| Example 8 | — | 2.7 |
| Example 9 | 1.15 | 3.9 |
| Example 10 | 1.06 | 2.7 |
| Comp. Ex. 4 | 1.43 | 4.1 |
| Comp. Ex. 5 | 1.52 | 4.8 |
| Comp. Ex. 6 | 1.48 | 4.3 |

The polyamide/polybutadiene/acrylonitrile block copolymer having a phenolic hydroxyl group according to the present invention has good solubility in solvents and compatibility with other polymers and is excellent in handleability. When it is modifier with an epoxy compound, the polyamide/polybutadiene/acrylonitrile block copolymer having a phenolic hydroxyl group according to the present invention gives rise to an elastic material having high heat resistance, adhesiveness and solvent resistance, which is useful as a basic material applicable to a wide variety of applications.

The method of the present invention makes it possible to readily produce a polyamide/polybutadiene/acrylonitrile block copolymer having a phenolic hydroxyl group with controlled chemical structure without protecting phenolic hydroxyl groups which are functional groups, and without causing reactions of the hydroxyl groups with carboxyl groups and amino groups, or without requiring high temperatures upon polycondensation of them, thus avoiding side reactions such as decomposition or reaction of butadiene chains as well as amide exchange reaction.

As compared with the conventional polyamide/polybutadiene based copolymer, the polyamide/acrylonitrile/butadiene based block copolymer of the present invent ion gives rise to a thermoplastic elastic material which has remarkably improved solubility in solvents and compatibility with other resins, which is easy to handle without causing drastic change in physical properties, and therefore it is useful as a basic material of wide applicability.

What is claimed is:

1. A polyamide/polybutadiene based block copolymer comprising a polycondensate which comprises a reaction product of a polyamide having an aminoaryl group at each terminal thereof and produced by polycondensation between an aromatic dicarboxylic acid and a fluorine-containing aromatic diamine and a polybutadiene polymer or polybutadiene/acrylonitrile copolymer having a carboxyl group at each terminal thereof, and which is represented by the formula (Ib)

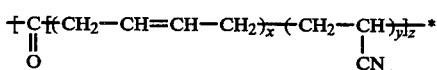

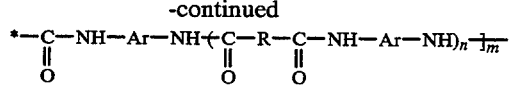

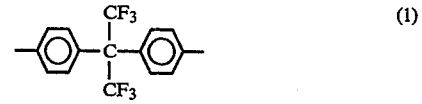

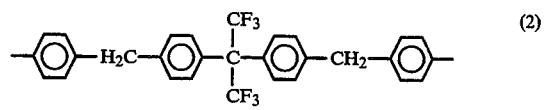

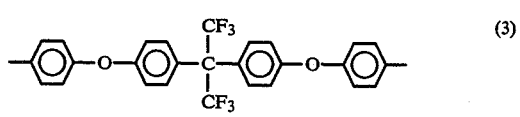

x, y, z, m and n each represent mean degree of polymerization and are integers in the ranges of x=3 to 7, y=0 to 4, z=5 to 15, n=1 to 30, and m=2 to 20, respectively.

2. A polyamide/polybutadiene based block copolymer as claimed in claim 1, wherein said fluorine-containing-polyamide/polybutadiene based block copolymer is represented by formula (Ic) below:

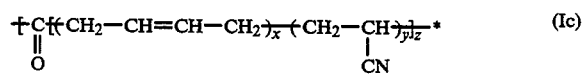

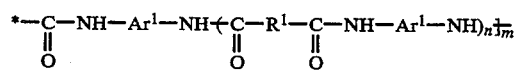

wherein $R^1$ is a group

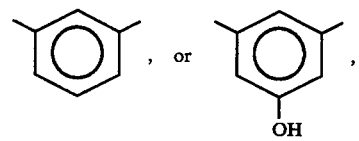

$Ar^1$ is a group

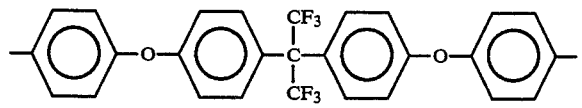

x, y, z, m and n each represent mean degree of polymerization and are integers in the ranges of x=3 to 7, y=0 to 4, z=5 to 15, n=1 to 30, and m=2, to 20, respectively.

3. A method of producing a fluorine-containing-polyamide/polybutadiene based block copolymer as claimed in either of claims 2 or 1, which comprises polycondensing a butadiene polymer or polybutadiene/acrylonitrile copolymer having a carboxyl group at each terminal thereof and represented by formula (IIc) below:

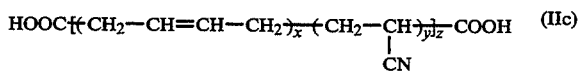

wherein x, y and z each are mean degree of polymerization and are integers in the ranges of x=3 to 7, y=0 to 4, and z=5 to 15, with a polyamide having an aminoaryl group at each terminal thereof and represented by formula (IIIc) below:

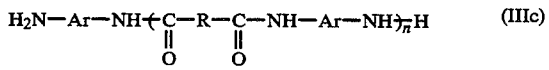
(IIIc)

wherein R is a divalent aromatic group represented by

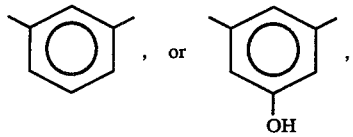

Ar is a divalent aromatic group represented by formula (1), (2) or (3) below:

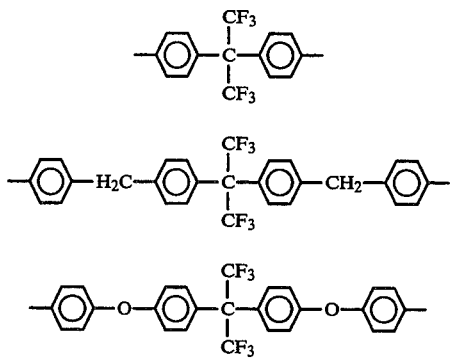

n is mean degree of polymerization and is an integer in the range of n=1 to 30, in the presence of an aromatic phosphite and a pyridine derivative.

4. A polyamide having a phenolic hydroxyl group in the main chain/polybutadiene/acrylonitrile block copolymer which comprises a polycondensate comprising a reaction product of a polyamide having an aminoaryl group at each terminal thereof and prepared by polycondensation of an aromatic dicarboxylic acid having a phenolic hydroxyl group in the main chain with an aromatic diamine, and a polybutadiene/acrylonitrile copolymer having a carboxyl group at each terminal thereof, and which is represented by formula (Ia),

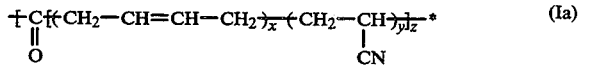
(Ia)

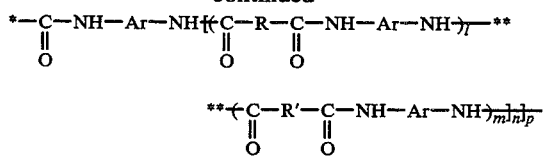

wherein R is a divalent organic group, R' is a divalent aromatic group having in the main chain a phenolic hydroxyl group, Ar is a divalent aromatic group, x, y, z, l, m, n and p each represent mean degree of polymerization and are integers in the ranges of x=3 to 7, y=1 to 4, z=5 to 15, l=0 to 29, m=1 to 30, n=1 to 30, and p=2 to 20, respectively, provided that m/(m+l)≧0.04.

5. A method of producing a polyamide/polybutadiene/acrylonitrile block copolymer as claimed in claim 4, which comprises polycondensing at least one dicarboxylic acid at least 4% by mole of which has a phenolic hydroxyl group with an aromatic diamine to form a polyamide having an aminoaryl group at each terminal thereof and represented by formula (IIIa) below:

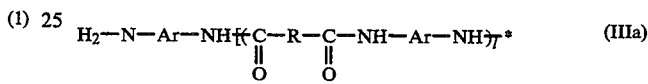
(IIIa)

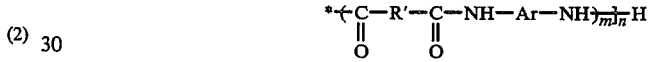

wherein R is a divalent organic group, R' is a divalent aromatic group having a phenolic hydroxyl group, Ar is a divalent aromatic group, l, m and n each are mean degree of polymerization and are integers in the range of l=0 to 29, m=1 to 30 and n=1 to 30, respectively, provided that m/(m+L)≧0.04; which is further polycondensed with a polybutadiene/acrylonitrile copolymer having a carboxyl group at each terminal thereof and represented by formula (IIa) below:

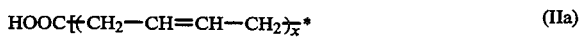
(IIa)

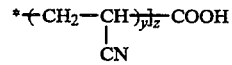

wherein x, y and z each are mean degrees of polymerization and are integers in the range of x=3 to 7, y=1 to 4, and z=5 to 15, each of said polycondensation reaction being performed in the presence of an aromatic phosphate and a pyridine derivative.

6. A reactive resin comprising as a main component a polyamide/polybutadiene/acrylonitrile block copolymer as claimed in claim 4 having a phenolic hydroxyl group.

* * * * *